US006926872B2

(12) United States Patent
Santilli

(10) Patent No.: US 6,926,872 B2
(45) Date of Patent: *Aug. 9, 2005

(54) APPARATUS AND METHOD FOR PRODUCING A CLEAN BURNING COMBUSTIBLE GAS WITH LONG LIFE ELECTRODES AND MULTIPLE PLASMA-ARC-FLOWS

(75) Inventor: Rugerro Maria Santilli, Palm Harbor, FL (US)

(73) Assignee: Hadronic Press, Inc., Palm Harbor, FL (US)

( * ) Notice: Subject to any disclaimer, the term of this patent is extended or adjusted under 35 U.S.C. 154(b) by 504 days.

This patent is subject to a terminal disclaimer.

(21) Appl. No.: 10/008,813

(22) Filed: Dec. 7, 2001

(65) Prior Publication Data

US 2003/0106787 A1 Jun. 12, 2003

(51) Int. Cl.[7] ................................................. B01J 19/08
(52) U.S. Cl. ............................ 422/186.21; 422/186.22; 422/186.26; 204/164; 204/165; 204/168
(58) Field of Search ....................... 422/186.21, 186.22, 422/186.26; 204/164, 165, 168

(56) References Cited

U.S. PATENT DOCUMENTS 6,540,966 B1 * 4/2003 Santilli ................... 422/186.21
2003/0113597 A1 * 6/2003 Santilli ........................ 429/17

* cited by examiner

Primary Examiner—Kishor Mayekar
(74) Attorney, Agent, or Firm—Dennis G. LaPointe

(57) ABSTRACT

Apparatus and method for processing crude oil, or oil-base or water-base liquid waste into a clean burning combustible gas via a submerged electric arc between at least one pair of consumable electrodes, which have a geometry permitting the operation for at least one month prior to their replacement, are completely contained inside a pressurized vessel, and have copper holders that are placed at a minimal possible mutual distance so as to minimize the power loss in the propagation of electricity through the electrodes, while having the other dimensions essentially unrestricted to maximize life. The invention is complemented with three optional recirculating flows substantially through the electric arc: i) a flow of the produced combustible gas; ii) a flow of the liquid feedstock; and iii) a flow of a liquid additive rich in a substance missing in the liquid feedstock for the production of the combustible gas with desired features.

60 Claims, 16 Drawing Sheets

APPARATUS AND METHOD FOR PRODUCING A CLEAN BURNING COMBUSTIBLE GAS WITH LONG LIFE ELECTRODES AND MULTIPLE PLASMA-ARC-FLOWS

BACKGROUND OF THE INVENTION

Numerous patents exist for the production of combustible gases by underliquid electric arcs between carbon-base electrodes, such as: the combustible gas disclosed in U.S. Pat. No. 603,058 to H. Eldridge; the combustible gas disclosed in U.S. Pat. Nos. 5,159,900 and 5,417,817 to W. A. Dammann and D. Wallman; the combustible gas disclosed in U.S. Pat. Nos. 5,435,274, 5,692,459, 5,792,325 to W. H. Richardson, Jr.; the combustible gas disclosed in U.S. Pat. No. 6,183,604 to R. M. Santilli; and others.

In all the above patents, the combustible gas is produced via an electric arc between a pair of electrodes of which at least one is made of carbon-base material immersed within water or a water-base liquid feedstock. The arc vaporizes the liquid and the carbon-base electrode, by forming a plasma of mostly ionized H, O, C and other atoms at about 10,000 degrees F. Besides a number of secondary thermochemical reactions depending on the selected method, the affinity between C and O dominates over the corresponding affinities between H and C or H and O, resulting in the formation of CO. The residual H atoms then generally combine to form the hydrogen gas $H_2$. The resulting gas is then composed by CO and $H_2$ in various proportions depending on the selected method as well as on the selected liquid feedstock.

The extremely high magnetic fields existing at atomic distances of the electric arc deform the orbitals of the atomic components of the combustible gas.

The combustible gases produced by an underliquid electric arc in the invention described herein are clean burning combustible gases. It should be indicated that these gases generally vary with the liquid feedstock evidently because of differences in the atomic structures. For instance, the gas produced from water as liquid feedstock is dramatically different than the gas produced by using an oil-base liquid feedstock. This is due to the fact that the former is clean burning because it is essentially composed by hydrogen and carbon monoxide, while the later is highly polluting being essentially composed by heavy hydrocarbon due to the general absence of oxygen in oil.

One of the main objectives of this invention is to reach a clean burning combustible gas for all possible liquid feedstocks. As explained in detail below, this result is achieved by adding to the electric arc plasma the substance missing in the liquid feedstock for the achievement of a clean burning combustible gas. For instance, the proper addition of oxygen to the electric arc plasma when using an oil-base liquid feedstock produces a clean burning combustible gas essentially similar to that produced from water as a liquid feedstock.

Generally, the combustible gases produced by underwater electric arcs can be clean because they generally contain no hydrocarbons, while CO is part of the combustible gas itself, rather than a byproduct of the combustion as it is the case for fossil fuels. Under ideal conditions of perfect combustion, the exhaust of combustible gases produced via underliquid electric arcs has no measurable hydrocarbons or toxic substances such as CO, while being essentially constituted by water vapor, oxygen, carbon dioxide and atmospheric gases. Therefore, the combustible gases addressed in this invention do have a large ecological importance.

The absence of a conventional molecular structure for the gas under consideration here can be proved as follows. Consider the production of a combustible gas via electric arcs submerged in ordinary water as feedstock. In this case, conventional thermochemistry teaches that said gas can only be composed of 50% CO and 50% $H_2$. This prediction is immediately disproved by measurements in the exhaust. In fact, had the prediction be correct, the exhaust should have at least 40% $CO_2$, while clear and repeated measurement have established that the exhaust contains about 7% of CO, thus implying that the gas contains about 10% of CO as conventionally referred to, namely, with a triple valence bond. Additional spectrographic measurements have established that the remaining 40% is present in combustible gas partly as isolated C and O atoms, partly as C—O in single valence bond, and partly as C=O in double valence bond, all bonded together into magnecular clusters. At the time of combustion only the triple valence bond CO is oxidized into $CO_2$, while the single and double valence bonds of C and O decompose because of their instability, thus explaining the presence in the exhaust of up to 15% oxygen.

In this invention we shall assume the definition of anode and cathode as generally used in batteries, according to which the anode is negatively charged and the cathode is positively charged, in which case the electrons of the DC electric current move from the negatively charged anode to the positively charged cathode. When we have a DC electric arc, the electrons exit the anode and hit the cathode, thus causing a temperature of the cathode which is much greater than that of the anode evidently caused by the collision of the electrons with the individual atoms of the cathode, collisions which are generally absent for the anode. This is the reason why, under certain power limitations identified below, the anode can be fabricated with temperature resistant metals such as tungsten, while no such metal is usable for the cathode due to its higher temperature. As a result carbon rods are generally used for the cathode evidently because carbon is conducting and has a melting point much greater than that of tungsten. It should be indicated that other definitions of the polarities of anodes and cathode exist in the art, jointly with different definitions for the flow of DC current. This is the reason why, to avoid possible confusion, we have identified above both the assumed polarities of anodes and cathodes as well as the actual direction of motion of the electrons.

As a matter of consistency only, the cathode, as defined and used in the specifications herein, will sometimes be referred to as the first electrode and accordingly, the second electrode will sometimes be referred to as the second electrode.

Also, we shall at times use the generic term of "electrodes" because of the possibility of using an AC, rather than a DC current, in which case any differentiation between anode and cathode is evidently inessential.

Carbon-base electrodes are rapidly consumed as a necessary condition to provide the carbon necessary for the thermochemical reactions occurring in the formation of the combustible gas from a water soluble feedstock. For instance, a DC electric arc between 1" diameter carbon-base rod electrodes within water or water soluble liquid feedstock powered by a 50 Kwh DC generator generally consumes the consumable (or sacrificial) electrode (positively charges cathode as assumed above) at the rate of about 1 linear inch per minute, corresponding to the consumption of about 0.76 cubic inches (ci) of carbon per minute or about 47 ci of carbon per hour. By noting that 50 Kwh generally produces 500 cubic feet (cf) of combustible gas per hour, the consumption of carbon per cubic foot of the produced gas is of the order of 0.1 ci/cf.

In all cases, the consumption of the negatively charged anode is generally minimal and about 1/10th that of the rate of consumption of the cathode.

A first major insufficiency of the above methods is that, due to said rapid consumption, carbon-base electrodes are continuously fed into the vessel through seals. Such embodiments can only deliver the current to the arc via bushing sliding under pressure along said carbon-base electrodes. In turn, such an arrangement implies severe limitations in the amount of deliverable electric current, with consequential inability to built large units operating with hundreds of Kwh.

A second insufficiency of pre-existing embodiments is that the sliding of the electrodes through seals into the vessel containing the liquid feedstock implies the impossibility of building equipment operating at high pressure due to the notorious weakness of sealing sliding carbon rods. In turn, this implies a loss of efficiency because the volume of the produced gas is known to increase with the increase of the operating pressure.

A third limitation of pre-existing patents on underliquid electric arcs is in the use of electrodes composed of a heat resistant metal such as tungsten. Tungsten can only be used for the anode as well as only for powers not to exceed 50 Kwh. In fact, the cathode reaches temperatures beyond the melting point of tungsten due to the fact that the electrons of the DC current move from the anode to the cathode, thus producing in the latter higher temperatures due to the collision of said electrons in the cathode. Also, for powers in excess of 50 Kwh the temperature of the cathode itself becomes bigger than the melting point of tungsten. Therefore, tungsten base electrodes are not industrially viable.

A fourth limitation of pre-existing patents is their inability to produce a clean burning combustible gas when using oil as a feedstock. This is due to the fact that oil has the chemical structure $C_nH_{2n}$ with the general lack of oxygen. It is then evident that the use of carbon-base or tungsten electrodes cannot produce a clean burning combustible gas when using oil as feedstock precisely in view of the absence of oxygen.

A fifth limitation of pre-existing patents is their inability to control the relative percentages of CO and $H_2$ in the produced combustible gas, which limitation is due to the availability of essentially fixed electrodes per each given liquid feedstock.

The scope of this invention is that of resolving all these limitations of the electrodes in pre-existing patents utilizing underliquid electric arcs.

SUMMARY OF THE INVENTION

The invention relates to equipment for the efficient production of a clean burning combustible gas comprising a high pressure metal vessel essentially filled up with a liquid feedstock. The equipment includes submerged electrodes with conducting holders having a geometry which minimizes the distance between the electric arc and each holder while having the remaining dimensions essentially unrestricted.

In another embodiment, the invention relates to equipment for the efficient production of a clean burning combustible gas with long life electrodes comprising a high pressure metal vessel essentially filled up with a liquid feedstock. The equipment includes submerged electrodes with conducting holders having a geometry which minimizes the distance between the electric arc and each holder while having the remaining dimensions essentially unrestricted; and means for recirculating the produced combustible gas through the electric arc. The electrodes may be carbon-base.

In a still further embodiment, at least one of the electrodes may be configured to rotate.

The electrodes may also consist of long hollow cylinders, with the electric arc occurring in between the parallel long edges of the cylinders. In another electrode configuration, one electrode may be a long hollow cylinder and the other made be of rectangular shape with essentially the same length. An alternative electrode configuration may be to have at least one of the electrodes having the shape of a ring.

The achievement of electrodes with sufficiently long life to be industrially viable cannot be achieved by using a carbon rod with a large diameter for a given electric power, for instance, using electrodes constituted of 5" carbon rods for a 50 Kwh power, because in this case the tip of the electrode cannot reach incandescence, with consequential decrease of the efficiency.

Moreover, the resistance of carbon is about 30 times that of copper. Therefore, the delivery of the electric current through long carbon sections implies a dramatic loss of power with only a small portion being delivered at the arc. This is the case, for instance, when 50 Kwh of DC electric power are delivered through 10 linear inches of 1" diameter carbon rods, in which case the power actually delivered at the arc is only of the order of 10 Kwh, following a 25% loss due to the AC-DC rectification.

This invention deals with the achievement of embodiments for the production of a clean-burning combustible gas via underliquid electric arcs among carbon-base electrodes which:

1) is powered by at least 200 Kwh DC power unit for industrial production;

2) can operate for at least one entire month without replacement of the electrodes;

3) the design is such to minimize the loss due to the propagation of electricity through the electrodes, or, equivalently, to maximize the electric power at the arc;

4) the equipment operates at high pressure, such as 150 psi, so as to maximize efficiency; and 5) the chemical composition of the produced combustible gas can be controlled.

By recalling that we have the consumption of about 0.1 ci of carbon per cf of produced gas, the use of 200 Kwh power unit implies the production of about 2,000 cf of combustible gas per hour, or the production of 16,000 cf per day, or the production of 80,000 cf of combustible gas per 5-days week, or 320,000 cf per month, with corresponding consumption of carbon of 200 ci/h, 1600 ci/day, 8,000 ci/week, and 32,000 ci/month.

The achievement of high operating pressures can only be reached with carbon-base electrodes being completely contained inside the metal vessel holding the liquid feedstock. The needed controls can then be realized via polished metal shafts holding said carbon-base electrodes and protruding outside said vessel, in which case seals around polished metal shaft can indeed be effective.

A first objective of this invention is therefore that of reacting an efficient geometry of electrodes holding 32,000 ci of consumable carbon so as to achieve the desired duration of one month of uninterrupted operations. By remembering that we are dealing with a DC current, and that the anode does not consume appreciably, this objective can be achieved via identical electrodes having at least 16,000 ci of consumable carbon, and then inverting the polarities at the end of two weeks of operation.

More specifically, the invention is an apparatus and method for processing a liquid feedstock into a clean burning novel aforementioned gas via a submerged electric arc between at least one pair of electrodes with long life, minimal power losses and multiple flows substantially through said submerged electric arc, comprising: a pressure resistant vessel; the pressure resistant vessel being essentially filled with a liquid feedstock; at least one pair of electrodes having copper holders extending into copper rods extending from inside the pressure resistant vessel to outside said pressure resistant vessel; said at least one pair of electrodes having a geometry which minimizes a distance between an electric arc between the electrodes and said copper holders for minimizing power loss in the delivery of the current to said electric arc, said electrodes having remaining dimensions essentially unrestricted for maximizing their life; means for delivering a current to said at least one pair of electrodes at least sufficient to create said submerged electric arc; motion means for acting on said copper rods for initiating, maintaining and optimizing said submerged electric arc; means for collecting the gas produced by the submerged electric arc; means for automatically refilling the liquid feedstock for facilitating uninterrupted long operation; and heat exchanger means for utilizing a heat produced by a thermochemical reaction caused by said submerged electric arc for maintaining a constant temperature.

The liquid feedstock can be crude oil, oil-base waste or water-base waste, fresh water or seawater. The current of the submerged electric arc can be continuous or alternating.

The electrodes are typically composed of graphite or coal. In one embodiment, one of the at least one pair of electrodes is negatively charged and is composed of tungsten.

In another, one of the at least one pair of electrodes is positively charged and comprises a submerged, elongated and hollow cylinder, said copper holder filling up an internal volume of said hollow cylinder, and another of the at least one pair of electrodes is negatively charged and comprises a submerged elongated parallelepiped of length essentially equal to a length of said positively charged electrode, a minimal width and a minimal height to achieve the same life as that of the positively charged electrode, said negatively charged electrode being housed in a copper holder with a width protruding for consumption, said copper holder being placed at a minimal distance from the copper holder of the positively charged electrode, said negatively charged electrode being placed parallel to said positively charged electrode at a mutual distance suitable to generate a submerged electric arc, and the apparatus further comprises means for axially rotating said positively charged electrode, and means for radially moving the negatively charged electrode toward and away from said positively charged electrode.

In still another embodiment, one of the at least one pair of electrodes is positively charged and comprises a submerged ring housed within a copper holder with an axial portion protruding for consumption, and another of the at least one pair of electrodes is negatively charged and comprises a submerged rod having essentially a diameter equal to a width of said ring and a minimal length to achieve the same life as that of the positively charged electrode, said negatively charged electrode being housed in a copper holder with an axial portions protruding for consumption, said copper holder being placed at a minimal distance from the copper holder of the positively charged electrode and having an axial alignment essentially perpendicular to a radial surface of said ring so as to create a gap suitable for the generation of the submerged electric arc, and the apparatus further comprises means for axially rotating said ring-shaped electrode, and means for axially moving said rod shaped electrode toward and away from the other electrode.

In another embodiment, one of the at least one pair of electrodes is positively charged and comprises a submerged, elongated and hollow cone, said copper holder filling up an internal volume of said hollow cone, and another of said at least one pair of electrodes is negatively charged and comprises a submerged rod offset at an angle from an axis of said positively charged electrode so as to form a gap suitable for the generation of the submerged electric arc, said negatively charged electrode being house in a copper holder with an axial part protruding for consumption, and said copper holder of the negatively charged electrode being placed at a minimal distance from the copper holder of said positively charged electrode, and the apparatus further comprises means for axially rotating said positively charged electrode, and means for axially moving said negatively charged electrode toward and away from the conical electrode.

In another embodiment, one of the at least one pair of electrodes is positively charged and comprises a submerged, elongated and hollow cylinder, said copper holder filling up an internal volume of said hollow cylinder, and another of said at least one pair of electrodes is negatively charged and comprises a submerged rod having a minimal diameter and length to achieve the same life as that of the positively charged electrode, said negatively charged electrode being housed in a copper holder with an axial length protruding for consumption, said copper holder being placed at a minimal distance from the copper holder of said positively charged electrode, and said positively and negatively charged electrodes having perpendicular axial orientations at a mutual distance suitable for the generation of the submerged electric arc, and the apparatus further comprises means for rotationally, upwardly and downwardly moving said positively charged electrode in such a way to maintain the electric arc with said negatively charged electrode, and means for axially moving said negatively charged electrode toward and away said positively charged electrode.

In another embodiment, the at least one pair of electrodes comprises submerged, elongated and hollow cylinders of essentially equal lengths, said copper holders filling up internal volumes of said hollow cylinders, and said electrodes having parallel axial orientations at a mutual distance suitable to generate the submerged electric arc in their exterior cylindrical surfaces, and the apparatus further comprises means for axially rotating both electrodes; and means for radially moving at least one of said at least one pair of electrodes toward and away from the other electrode.

In still another embodiment, the at least one pair of electrodes comprises submerged rings of essentially the same widths, said rings being housed in copper holders with an axial part protruding for consumption, said copper holders being placed with parallel axes superimposed in such a way to create a gap in between their radial surfaces suitable for the generation of the submerged electric arc, and further comprises means for rotating both rings; and means for axially moving at least one ring toward and away from the other ring.

In a preferred embodiment, the holders of the at least one pair of electrodes penetrates a lid of the pressure resistant vessel, said lid having means for its rapid removal to facilitate the rapid servicing of the at least one pair of electrodes.

For enhancing the efficiency of production, three recirculating flows are anticipated by providing means for circulating a portion of the produced clean burning combustible gas exiting the pressurized vessel back into said vessel and substantially through said submerged electric arc; means for circulating said liquid feedstock substantially through said submerged electric arc; and means for circulating a liquid additive rich in a substance missing in the liquid feedstock substantially through said submerged electric arc.

If the liquid feedstock is carbon-deficient, the liquid additive can be carbon-rich. If the liquid feedstock is oxygen-deficient, then the liquid additive is oxygen-rich. If the liquid feedstock is hydrogen-deficient, then the liquid additive is hydrogen-rich.

Carbon-rich liquid additive can be an oil; oxygen-rich liquid additive can be water; and hydrogen-rich liquid additive can be a substance selected from the group consisting of hydrohalogens.

It is also preferred that means for automatically refilling the liquid additive for facilitating uninterrupted long operation be provided.

BRIEF DESCRIPTION OF THE DRAWINGS

FIG. 1b depicts the top view of the electrodes only of FIG. 1a;

DETAILED DESCRIPTION OF THE DRAWINGS

Figure 1A:
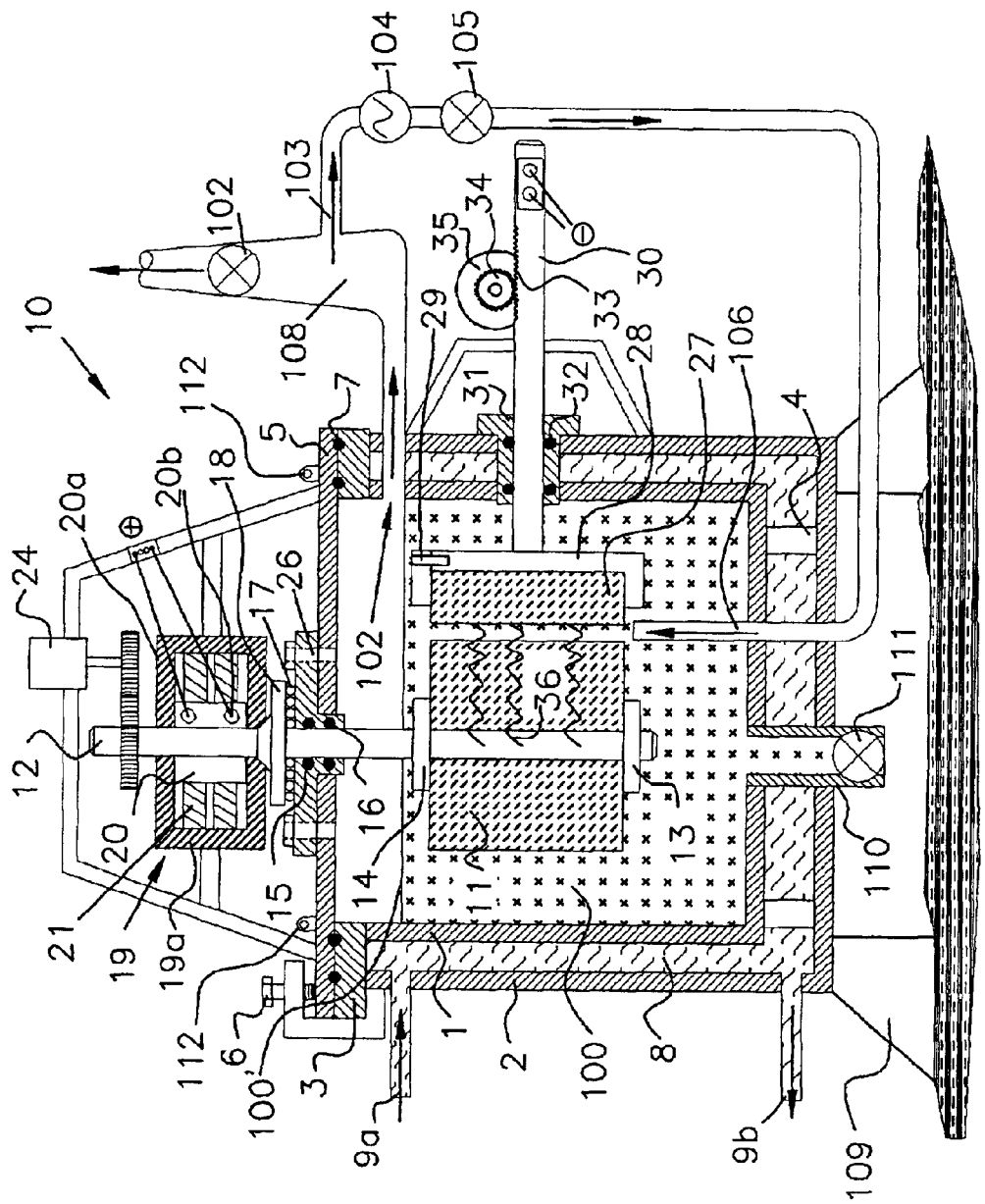
FIG. 1a depicts a partial cut away view of one embodiment of the present invention.
Figure 1B:
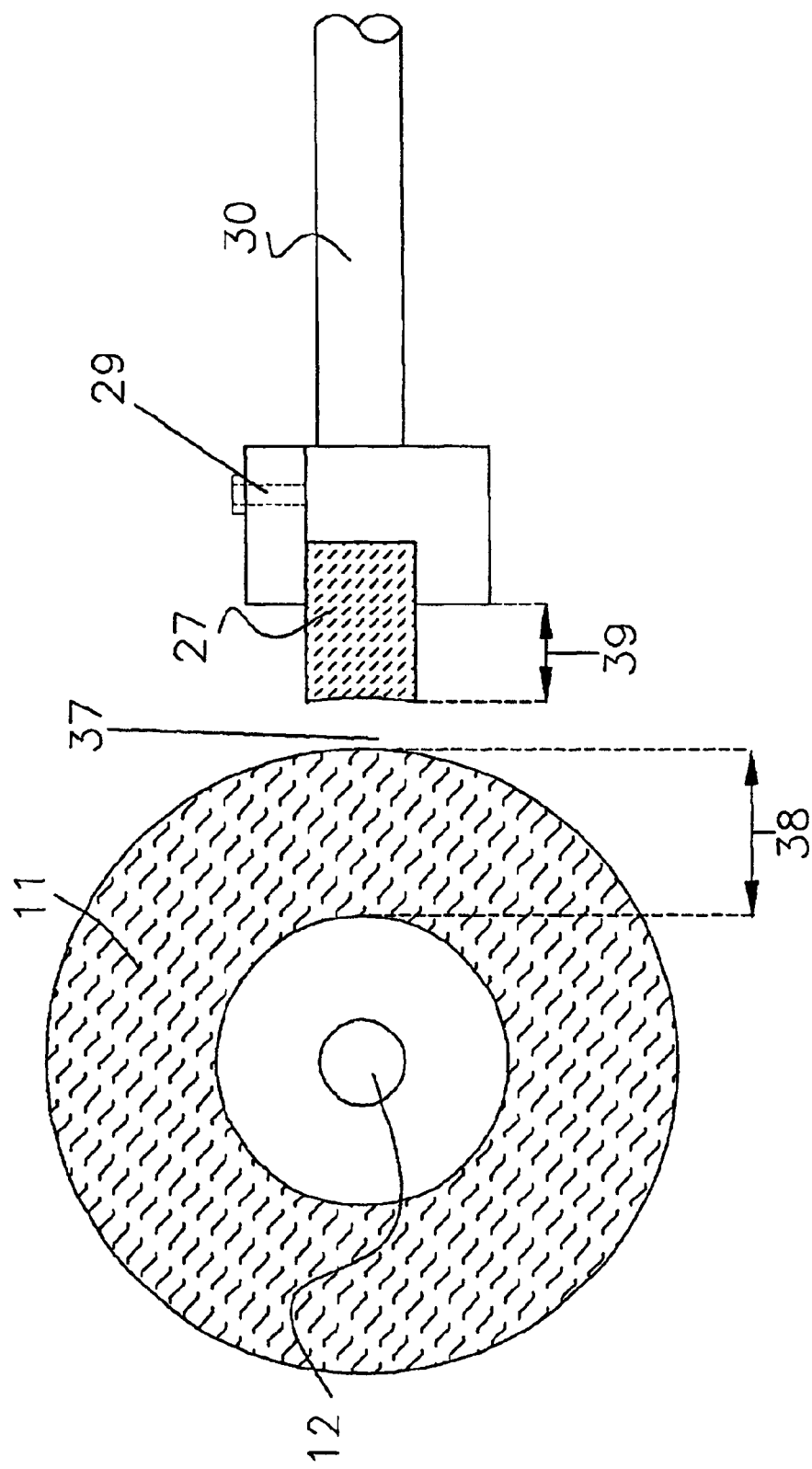
Figure 1C:
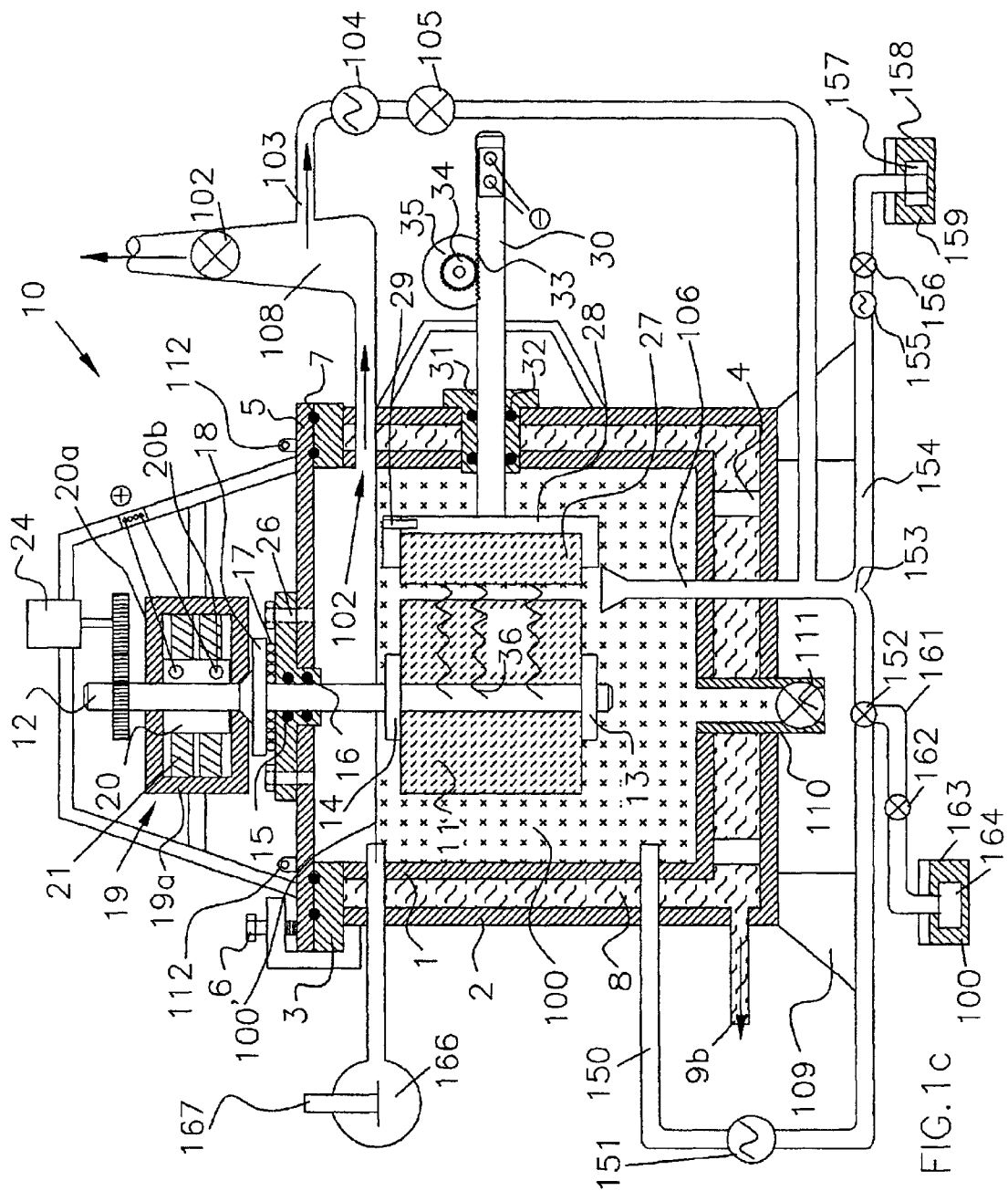
FIG. 1c depicts a partial cut away view of another embodiment of the present invention which is similar to the embodiment of FIG. 1a without the combustible gas recirculation line but with the alternative flow of the liquid feedstock and/or additives.

Referring to FIGS. 1a, 1b and 1c the invention, which is generally depicted as 10, and is shown configured as a first practical application conceived for an operation of about one week, that is, with a cathode 11 possessing at least 8,000 ci of consumable carbon all contained in the interior of the feedstock carrying liquid. This embodiment consists of a cylindrical metal vessel 1 of 7' height, 4' wide and ½" wall thickness, surrounded by a cylindrical metal vessel 2 of 7' 3" high, 4' 3" wide and ½" wall thickness, so as to leave a 3" space in between vessels 1 and 2 separated by metal spacers 4 welded to vessel 1. Both vessels 1 and 2 are closed at the top by a metal ring 3 of 1" thickness, 4' 9" outside diameter and 4' inside diameter, which is welded to vessels 1 and 2, and leaves an overhang of 3" over the outside diameter of 4'3" of vessel 2. Vessels 1 and 2 are completed by a metal lid 5 of 1" thickness and 4' 9" outside diameter which is fastened to the overhang of ring 3 via means 6 for fast removal and seals 7 assuring a pressure resistant interior.

Vessel 1 is filled up with a water-base or water-soluble liquid feedstock 100 up to level 100' which corresponds to the lower point of combustible gas outlet 101 for the exiting of the gas produced. The space in between vessels 1 and 2 is filled up with coolant 8 for the removal of the heat produced by the internal thermochemical reactions associated with the production of the combustible gas with inlet 9a and outlet 9b. The coolant 8 is typically circulated using a pump (not shown in the figure for simplicity) through a heat exchanger (also not shown in the figure for simplicity). Such pumps and exchangers are known in the art.

Submerged within the liquid feedstock 100, there is a hollow cylindrically-shaped carbon-base cathode 11 with 15" outside diameter, 3" inside diameter and 5' length, which is sustained or held by copper shaft 12 of 3" diameter, thus suitable to deliver up to 5,000 A. A nut 13 adapted for fast removal from said shaft 12 is included to hold the cathode 11 in place, that is, the cathode 11 is maintained by the locking of nut 13 tightening the cathode 11 against retainer plate or flange 14 of shaft 12. Flange 14 is typically approximately 5" outside diameter. Nut 13 also typically has an outside diameter of 5".

This configuration of the cathode permits the consumption of the cylindrical carbon from the original outside diameter of 15" to the final diameter of 5", namely a total of about 10,000 ci of carbon which, as indicated earlier, are indeed sufficient for the production of 80,000 cf of combustible gas at the rate of 0.1 ci/cf, or, equivalently, for the operation of one week composed of five days with 8 continuous working hours. Note that, following the indicated consumption, cathode 11 still remains with 1" or more of radial carbon for its fastening between flange 14 and nut 13.

Cathode's shaft 12 passes through the lid 5 via bushing 15 of insulating material such as phenolic, with seals 16. The weight of the cathode assembly is sustained by planar ball bearing 17 which acts against face 18 of retainer flange (plate) 18a extending from shaft 12. Immediately following flange 18a, there is a contact assembly 19 for the delivery of the positive polarity of the electric current to shaft 12 consisting of two opposing bushings (brushes) 20, 20a of conducting material having a low coefficient of friction with copper such as carbon, with the dimension of 3" in thickness, 3" in width, 5" in length and terminating with a half cylindrical shape of 3" diameter so that the two opposing bushings 20,20a reach full contact with 3" shaft 12. Bushings 20,20a are pressed against shaft 12 by springs 21 contained in encasement 19a. FIGS. 1a and 1c depict the positive polarity wires connected to terminal 20b.

Immediately following contact assembly 19 in the upward direction, there is gear 22 attached to shaft 12 of 7" outside diameter and ½" thickness with a smaller gear 23 of 1" outside diameter, the latter being powered by electric motor 24 so as to permit the rotation of the cathode 11 at the rate of about 1 revolution per minute. Motor 24 is sustained by base 25 welded to lid 5. Bushing 15 is fastened to lid 5 via bolts 26.

As also depicted in FIG. 1b, opposite to the cylindrical shape of cathode 11 in all its length, there is anode 27 consisting of a carbon-base material in a rectangular shape of 5' length, and approximately 4" square in cross-section, encased into copper holder 28 in such a way to expose the 4" side, thus having a total of about 1,000 ci of consumable carbon, namely, about ⅒th that of the consumable cathode. Holder 28 is adapted to include means 29 for fast removal and replacement of the anode 27. Such quick disconnects and/or fasteners adapted to rapid unfastening are known in the art. Holder 28 is connected to copper shaft 30 which passes through vessels 1 and 2. Copper shaft 30 is 3" diameter and passes through nonconducting bushing 31 with seals 32. Shaft 30 contains rake 33 at least 4" long with pinion 34 operated by electric motor 35 for the sliding of shaft 30 toward and away from cathode 12. The action of electric motor 35 is controlled by computerized means based on the voltage of the arc, which means are not shown in the figure for simplicity. Said means are used to initiate, maintain and optimize the electric arc 36 in between cathode 12 and anode 27.

The combustible gas produced by the submerged electric arc exits vessel 1 through outlet 101 into high pressure pipes 108. The internal operating pressure is controlled by back-pressure regulator 102 which is usually set at the needed pressure, such as 70 psi when the combustible gas is used to power turbines. In one alternative embodiment, part of the produced combustible gas can be released from pipe 108 into a secondary high pressure pipe 103 and sent back into vessel 1 through outlet 106 using pump 104 to force the flow through the gap between the cathode 11 and anode 12. The flow rate may be controlled using valve 105.

Vessel 2 is equipped with legs 109 standing on the floor, and includes a high pressure drainage pipe 110 of 5" diameter with valve 111 for the fast removal of the liquid feedstock 100 into a pan not shown in the figure for simplicity. Lid 5 is equipped with ears or lifting eye pads 112 for its quick lifting for internal service via means not shown in the figure for simplicity. A forklift with cables or a jib crane and cables can be used. Three eye pads 112 are preferable.

When the combustible gas is partially recirculated into vessel 1 through outlet 106 and is directed and forced flown through or near the arc 36, the combustible gas bubbles through the electric arc in between the anode and cathode. This process provides the advantages of:

i) achieving a better magnecular structure;

ii) breaking down possible hydrocarbons with consequential increase of the quality of the exhaust;

iii) increasing the thermochemical reactions with consequential increase of the heat produced during the formation of the combustible gas;

iv) removing the hydrogen and oxygen from the electric arc soon after their creation, thus reducing their recombination into water with consequential increase of the efficiency; and v) removing the carbon monoxide from the electric arc immediately following its creation, thus decreasing its oxidation into carbon dioxide with consequential additional increase of the efficiency.

In fact, various experimentations have established that recirculation of the combustible gas through the electric arc implies an increased energy content of the combustible gas. The same happens every time the said gas is re-recirculated through the electric arc. Various measurements have established that one recirculation of the combustible gas through the electric arc implies an increase of about 10% energy content of the gas, thus supporting the multiple recirculations of said combustible gas which is not shown in the figures for simplicity.

Additional experimentations and gas chromatographic measurements have established that the combustible gas produced by underliquid electric arcs contains traces of hydrocarbons, which, as well known, are long polymers of the methylene CH2 group. It then follows that the recirculation of said combustible gas through the electric arc does indeed implies the breaking down of hydrocarbons. Therefore, said recirculation is important to improve the purity of the combustible gas produced. Again, the more times the combustible gas is recirculated through the electric arc, the better is its environmental quality.

Extended studies indicate that the heat predicted by thermochemistry to be released by the formation of $H_2$ and CO should be of about 2,260 BTU per cf of combustible gas produced. In fact, the reaction H+H−>$H_2$ releases about 105 Kcal/mole, while the reaction C+O−>CO releases 255 Kcal/mole. Therefore, the thermochemical reactions underlying the creation of a combustible gas via underliquid electric arcs release very large amounts of energy in the form of heat. The latter is acquired by the liquid feedstock because the said liquid cools down the arc plasma and the combustible gas itself.

In reality, various measurements have established that the actual heat produced by said thermochemical reactions and acquired by the liquid feedstock is of about 250 BTU/cf, that is, 1/10th of the predicted heat. This disparity is another experimental evidence of the magnecular structure of the combustible gas because it establishes that only part of the H, C and O atoms are bonded together into the conventional molecules $H_2$ and CO, while the remaining atoms and related dimers are bonded together into magnecular clusters.

It then follows that the recirculation of the combustible gas through the electric arc necessarily implies an increase of the heat produced per cf and acquired by the liquid feedstock, because of the formation of additional conventional molecules $H_2$ and CO whenever the combustible gas passes through the electric arc, with consequential release of additional heat. In particular, measurements have established that the recirculation of the gas through the electric arc doubles the amount of heat released by the related thermochemical reactions provided that the equipment is operated at least at 70 psi, with lesser increases at lower pressures and bigger increases at bigger pressures.

It is evident that such increase of heat is very important for this invention because it permits the self-generation of electricity. To illustrate this possibility, assume that the equipment is operated with an oil-base liquid waste as feedstock at 70 psi internal pressure, in which case the production of one cf of combustible gas requires about 50 W of AC current converted into DC, and about 37 W of DC current at the arc after the loss of 25% due to the conversion of AC into DC current. Suppose now that the combustible gas is recirculated only once by producing heat in the amount of about 500 BTU/cf. Suppose that 100 BTU/cf are dissipated despite the best possible insulating means, thus remaining with 400 BTU/cf of usable heat. Suppose that such a heat is acquired by water as a cooling liquid at 500 degrees F., thus achieving a temperature sufficient to produce steam suitable to power a turbine operated DC generator. Suppose that, as standard in the industry, such a DC generator has the low efficiency of 33%, thus converting only 132 BTU/cf=38 W/cf into DC current. It is then evident that the heat of the preceding embodiment can produce sufficient DC electric current to be operate its own arc at the rate of 37 BTU/cf. The cost of the combustible gas then becomes manifestly competitive over the cost of fossil fuels, particularly after including the income for the recycling oil waste as feedstock.

We have recalled earlier that the primary reason for the low efficiency of equipment with pre-existing patents is the fact that the electric arc is indeed very efficient in the separation of liquids. However, about 80% of the H and O gases produced recombine into $H_2O$ when in the presence of an electric arc, CO oxidizes into $CO_2$ when in an oxygen rich environment also in the presence of an electric arc, and other reactions occur all reducing the efficiency of the equipment.

The recirculation of the combustible gas through the electric arc evidently resolves all these problems because it removes H and O from the electric arc immediately following their formation, thus dramatically decreasing their recombination into $H_2O$ with consequential increase of the combustible gas produced. For instance, the recirculation of the combustible gas at the rate of about 10 cf per minutes doubles the production of said combustible gas from the same equipment where the electric arc is stationary within the liquid feedstock.

Similarly, the recirculation of the combustible gas through the electric arc removes the CO from the oxygen rich environment in the presence of the electric arc, thus preventing its oxidation into $CO_2$. By recalling that $CO_2$ is not combustible, the reduction of the formation of $CO_2$ implies an increase of the energy content of the combustible gas per cf. In fact, said flow of 10 n cf of the combustible gas per minute implies the virtual elimination of $CO_2$ with consequential increase of the energy content of about 15%.

Since underliquid electric arcs occur at the smallest possible distance between carbon-base anodes and cathodes, it is evident that the invention herein described permits the consumption of the rotating cylindrical cathode 11 with a comparative consumption of the anode 12 at about 1/10 that of the cathode 11, thus permitting indeed the operation for one complete week.

Note that the electric current follows the path of least electric resistance. When arc 36 of FIG. 1a is in any location along the 5' length of the cathode-anode pair, the electric current will always originate from the copper shaft directly underneath said location, rather than propagate though the carbon. This assures the achievement of the minimal possible dissipation of electric power, or maximal possible efficiency while having long life.

The embodiment herein considered also permits the operation at operating pressures of approximately 150 psi or more, thus maximizing the production of the combustible gas, while reducing the need for an intermediate pumping station.

Finally, the embodiment of FIGS. 1a, 1b, and 1c permits rapid access to the interior of the reactor for fast servicing. The vessel 1 can be emptied by draining the feedstock 100 through drain 110. Fasteners 6 can be removed or disengaged and lid 5 may be picked-up and moved out of the way using the lifting pads 112. Once exposed, anode 11 can be easily replaced by unlocking nut 13. Similarly, once the liquid feedstock is removed, anode 27 can be easily replaced by unlocking fastener means or bolt 29.

FIG. 1c also presents two alternative means for continuously moving the plasma away from the electric arc immediately following its formation, in addition to the means of the preceding embodiment based on the flow of the combustible gas produced. The second means is given by recirculating the liquid feedstock through the electric arc. As depicted in FIG. 1c, this second means is achieved via a high pressure pipe 150 exiting from the internal vessel 1 and the external vessel 2 below the liquid feedstock level, which pipe 150 is connected to pump 151 for the recirculation of the liquid feedstock through the electric arc via exit pipe 106 located just underneath the gap in between the electrodes. In this case valve 152 permits the adjustment of the recirculation flow for maximal efficiency.

The third means for continuously moving the plasma away from the electric arc immediately following its creation is given by the flow through the electric arc of an additive rich of an element which is either missing in the given liquid feedstock or needed to achieve a combustible gas with pre-determines characteristics. This third means can be achieved via the separate high pressure pipe 154 connected to a separate pump 155, valve 156, strainer 157 and container 158. Container 158 can be filled up with a liquid rich in the selected substance as specified below. In this case, pipe 155 forces liquid additive 159 through the electric arc via end pipe 160. Valve 156 is used to optimize the flow of the liquid additive.

A first example of liquid additive 159 is given by ordinary tap water whose use is recommendable when the feedstock 100 is an oil base liquid. As indicted earlier, oil base liquids are very deficient in oxygen, thus rendering impossible the production of a clean burning combustible gas because the electrodes themselves are carbon-base, thus resulting in an excess of carbon under a great deficiency of oxygen resulting in the production of heavy hydrocarbons CnH2n as well as carbon deposits around the tips of the electrodes similar to fullerenes. The use of water as liquid additive 159 resolve this problem because water is rich in oxygen. During its flow through the electric arc, water is decomposed by therefore releasing the missing oxygen. Upon optimization of its flow via valve 156, while passing through the electric arc, water is decomposed, thus releasing oxygen and permitting: i) the production of a clean burning combustible gas essentially constituted by CO and $H_2$ without heavy hydrocarbons; ii) the essential elimination of the fullerene-type growth around the tips of the electrodes; and iii) a dramatic decrease of the consumption of carbon-base electrodes.

Another example of additive 159 is given by any oil-base liquid which is recommendable when the liquid feedstock is deficient in carbon, as it is the case for water, sewage and, in general, water base wastes. In fact, in this case the flow of oil additive 159 through the electric arc provides the carbon missing in the liquid feedstock, this permitting the production of a clean burning combustible gas while dramatically increasing the life of the carbon-base electrodes.

Needless to say, as depicted in FIG. 1c, all the above identified three means of this invention for continuously moving the plasma away from the electric arc immediately following its creation, can be combined with a consequential maximization of the efficiency, that is, of the volume of combustible gas produced as well as of heat produced for any given power source.

As also depicted in FIG. 1c, the apparatus is completed by means for the automatic refill of the liquid feedstock and its maintenance at a fixed level so as to permit completely automatic uninterrupted operations over a long period of time. The latter means consist of: cavity 166 with level 100' of the liquid feedstock in its interior; level sensor 167; secondary pipe 161; valve 162; strainer 163; and external tank 163 filled up with the same liquid feedstock 100 as that in the interior of vessel 1. The consumption of the liquid feedstock 100 activates sensor 167 which automatically opens valves 152 and 162, closes valves 156 and 105, and activates pump 151 thus pumping liquid feedstock 100 contained in external tank 164 into vessel 1. When the pre-set level 100' of the liquid feedstock 100 inside vessel 1 is regained, then the automatic sensor 167 shuts off valve 162 and resume the original combinations of the three flows through the electric arc. Note that this automatic refilling is done without interruption of operations.

It should be finally indicated that numerous additional means for utilizing the heat produced by the internal thermochemical reactions are possible besides those indicated in FIGS. 1a, 1b and 1c. For instance, a rapid and efficient means for utilized said internal heat is by passing liquid coolant 8 through a serpentine directly immersed within the liquid feedstock 100. This and various other forms of heat transfer and utilizations are not indicated for simplicity.

FIGS. 2a through 2d present alternative configurations to the embodiments of FIGS. 1a through 1c, except that both anode and cathode are attached to or suspended from the upper lid. They can therefore be removed together from the vessel. In this way, the vessel need not be drained of the liquid feedstock to service the anode and cathode. Another advantage of this embodiment is that it provides a better geometry for the flow of the produced combustible gas through the electric arc as more fully described below.

The hollow cylindrical cathode 200 and the rectangular anode 201 are essentially the same in size and shape as the corresponding cathode 11 and anode 27 of the previously described embodiments. Cathode 200 is supported by a copper shaft 202 of 3" diameter and it is fastened in between a 5" retainer flange (plate) 203 extending from said shaft 202 and nut 204. The cathode assembly is supported by two ball bearings 205 and 206 which, in turn, are supported by metal frame members 207 and 208 welded to the lid 209, which covers vessels 210 and 211 and ring 212. Fasteners 213 such as a quick-release clamp is used as a hold-down for lid 209, similar to the configuration of FIGS. 1a and 1c, except that now vessel 210 has the cylindrical shape of 7' wide, 5' in height and ½" wall thickness, while vessel 211 has such a shape to leave a 3" space in the exterior of vessel 210.

Immediately following retainer plate 203, there is a contact assembly 214 essentially similar to assembly 19 of FIG. 1a. The positive polarity of the DC current is delivered to contacts 216 through wire 215 connected at terminal 216a, the wire 215 passing through lid 209 via pressure resistant seals 217. On the left of contact assembly 214, there is metal gear 218 of 7" outside diameter and ½" thickness which is connected to a reduction box and electric motor assembly 219 fastened to metal frame support member 207 so as to allow the rotation of cathode 200 at the rate of about one revolution per minute. The electric current to operate motor assembly 219 is supplied via cable 220 which also passes through lid 209 via pressure resistant seals 217.

Anode 201 is held by a rectangular copper holder 221 with means 222 for fast opening, such as by using a quick removal bolt, pin or other clamping/fastening means for releasing one side, or other suitable fastening or holding arrangement which facilitates the fast removal of anode 201 while assuring a positive contact of the copper holder with the same anode 201 so as to have a proper delivery of the electric current. Holder 221 is solidly connected to copper shaft 223 of 3" in diameter which continues upwardly through lid 209 via bushing 224 made of an insulating material such as phenolic and fastened to lid 209 via bolts 225. High pressure in vessel 210 is maintained via seals 226 and 227, while the proper alignment of shaft 226 is maintained via linear bearing 228. Copper shaft 223 is completed by rack 229 capable of at least 5", linear displacement which is coupled with motor assembly 230 in such a fashion to be able to cause the upward or downward motion of shaft 223, said motor assembly 230 being held by frame 231 welded to lid 209.

After release of fasteners 213, the entire lid assembly can be removed from vessel 210 via lifts acting on ears or lifting eye pads 232. Once exposed, cathode 200 can be easily replaced by pivoting (or by quick-disconnect means, e.g. a locking pin mechanism), disassembling the lower part of frame 208 at joint 233 equipped with lock not shown in the figure for simplicity, and by unlocking or releasing nut 204. Anode 201 can also be quickly replaced by unlocking holder 221. The entire service operation in replacing cathode and anode can be done in about 10 minutes.

Figure 2A:
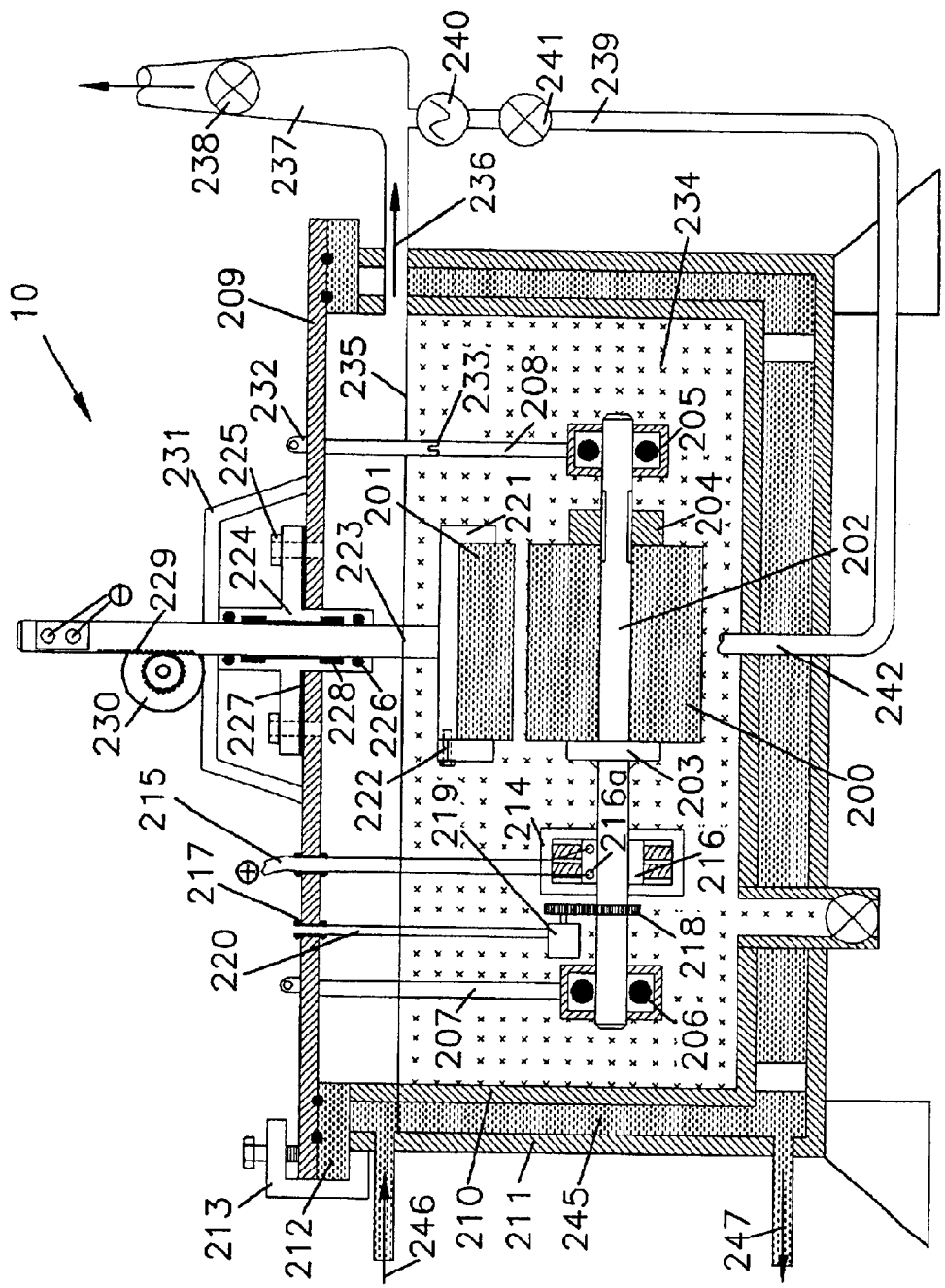
FIG. 2a depicts a partial cut away view of another embodiment of the present invention.
Figure 2C:
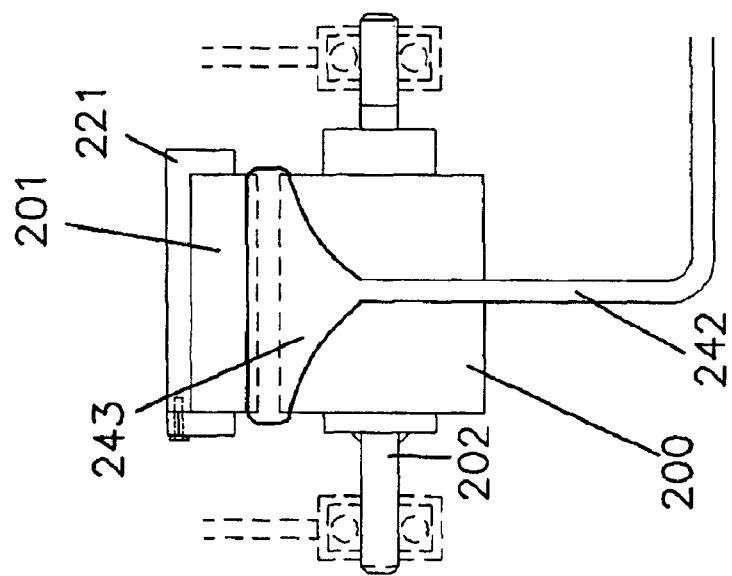
FIG. 2c depicts a top view of the depiction of FIG. 2b.
Figure 2B:
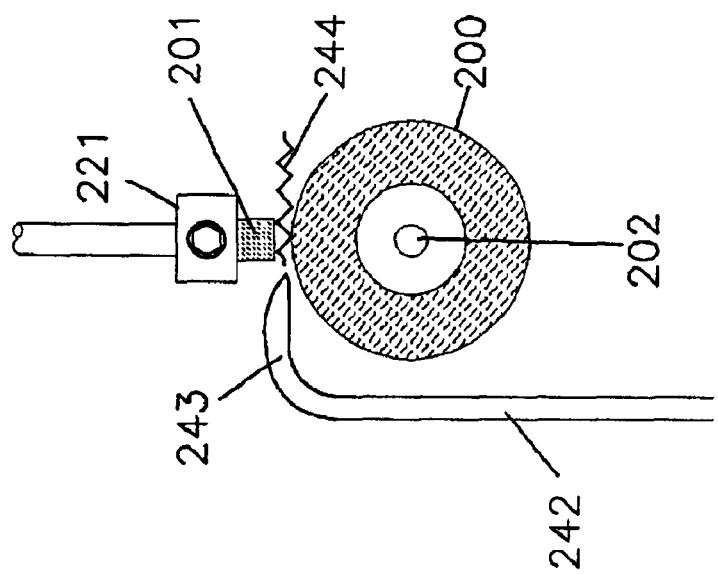
FIG. 2b depicts an end cross-sectional view of the electrodes of the preceding embodiment with the combustible gas being directed through the arc gap.
Figure 2D:
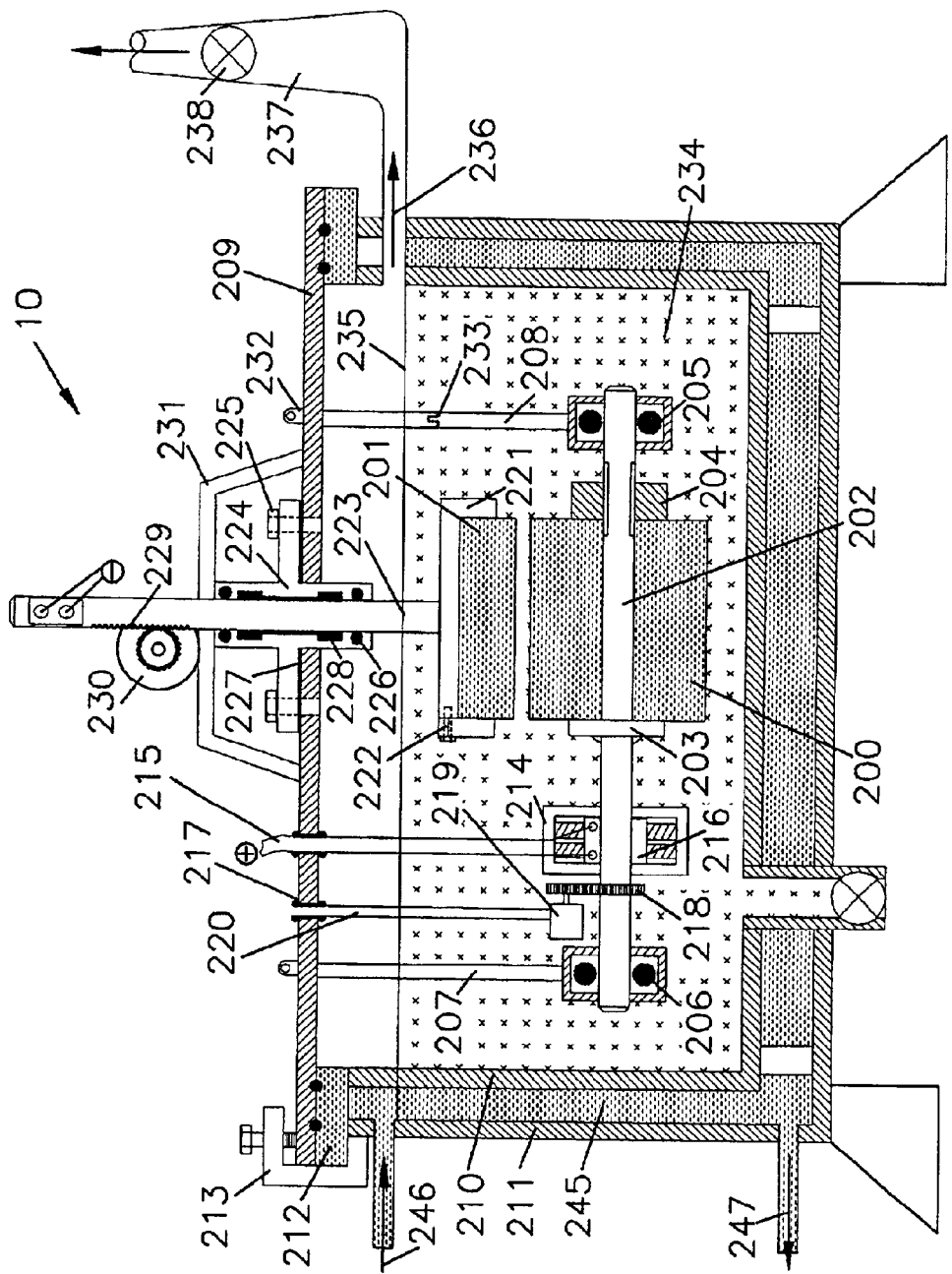
FIG. 2d depicts an embodiment similar to that depicted in FIG. 2a without the combustible gas recirculation line.

This embodiment is completed by filling up vessel 210 with liquid feedstock 234 up to level 235, that is, up to the lower edge of exit 236 of the produced gas. The produced combustible gas exits vessels 210 and 211 through high pressure pipe 237 whose pressure is controlled by back-pressure regulator 238. In another alternative embodiment as shown in FIG. 2a, part of the produced combustible gas is re-routed into recirculation pipe 239 and sent back into vessel 210 via pump 240 and valve 241 to exit via outlet 242. With reference to FIGS. 2b and 2c, the gas outlet 242 ends or transitions into a T-shaped pipe or nozzle 243 with a cut $\frac{1}{16}$" wide and 5' long which is aligned in such a way that the combustible gas exiting at 244 passes through the entire 5' long gap between cathode 200 and anode 201 through the other side of the gap. This configuration assures an even more efficient re-circulation of the combustible gas than that of the configuration depicted in FIGS. 1a–1c, with consequential better achievement of features i) ii), iii), iv) and v) identified earlier.

The 3" space in between vessels 210 and 211 is filled up with coolant 245 such as antifreeze, with inlet 246 and outlet 247. A pump not shown in the figures for simplicity circulates coolant 245 through a heat exchanger (also not shown in the figure for simplicity). An adjustment of the flow of said coolant 245 then permits the maintaining of the vessel during operations at a desired constant temperature. This outer jacket heat exchanger means is similar to that provided for the previously described embodiments represented by FIGS. 1a–1c.

The above embodiments cannot yet be extended to operate for one full month because they would require a cathode which is 4 times the length of the cathode currently described for the above embodiments, that is, a cathode which is 20' long. This is in most cases somewhat impractical.

Figure 3A:
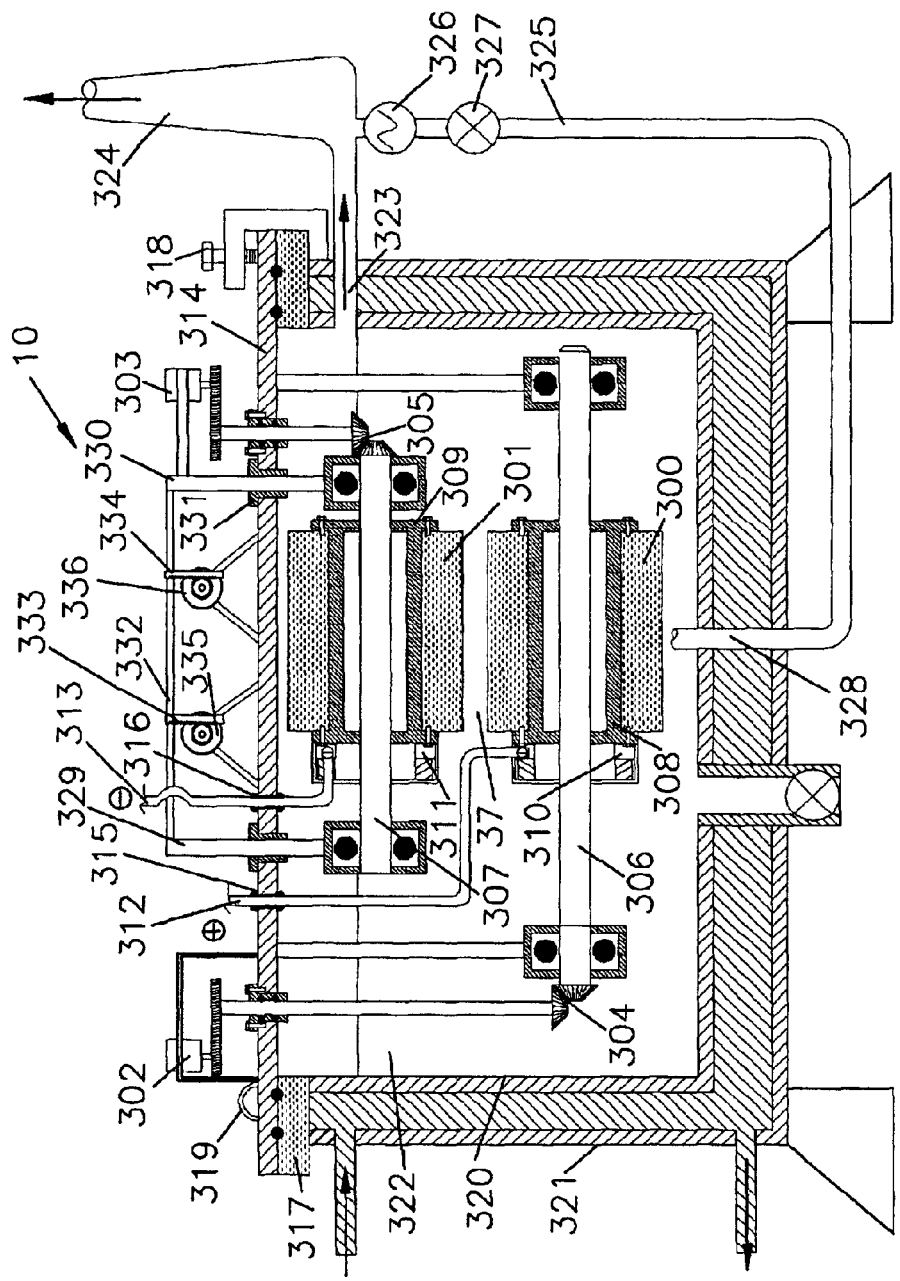
FIG. 3a depicts a partial cut away view of still another embodiment of the present invention.
Figure 3B:
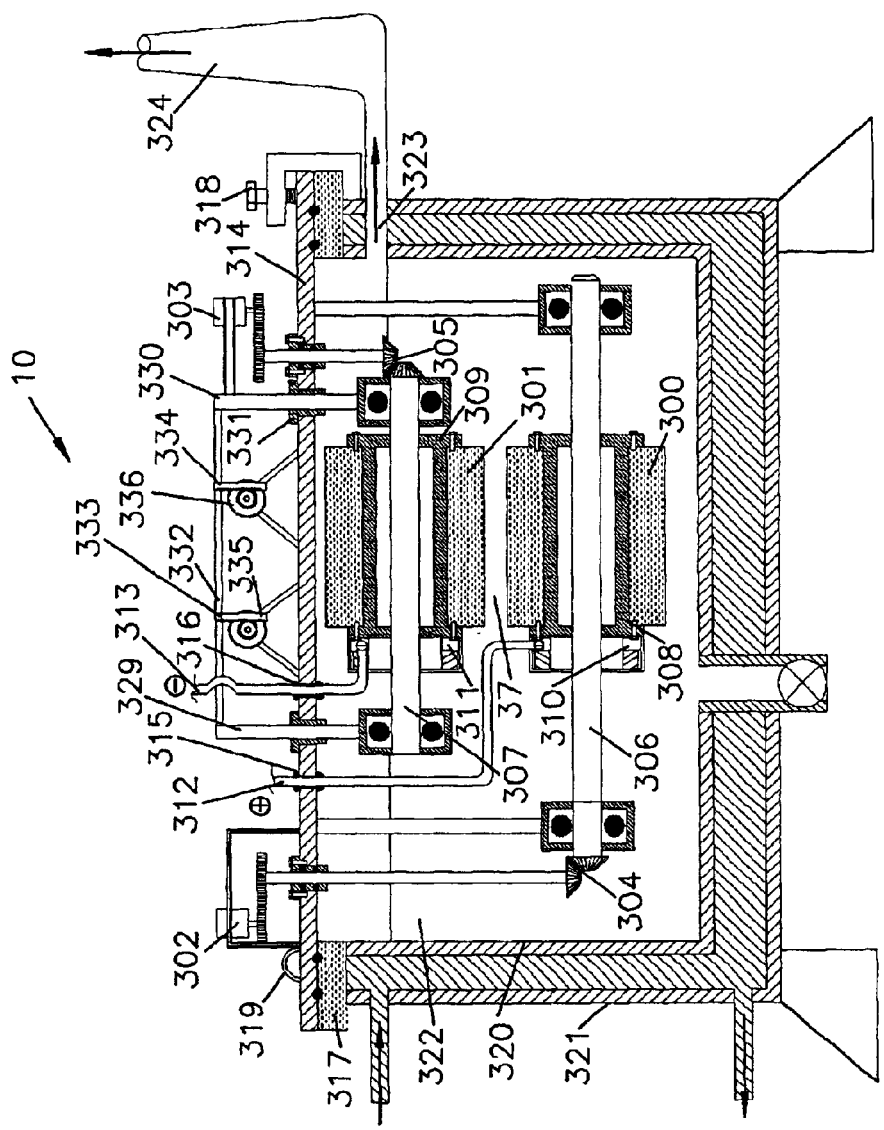
FIG. 3b depicts an embodiment similar to that depicted in FIG. 3a without the combustible gas recirculation line.

Another preferred embodiment which can increase operational time for one full month of operation consisting of four weeks, each with 5 days of 8 working hours each, is depicted in FIGS. 3a and 3b. Its cathode 300 and anode 301 consist of two identical hollow cylinders with 40" outside diameter, 30" inside diameter and 3' in width (length) which individually contain about 20,000 ci of carbon during the consumption from 20" radius down to 14", by leaving in this way 1" of unused carbon in the internal radius which is needed for fastening. By recalling that 8,000 ci of carbon were needed for one week of work as per the embodiments of FIGS. 1 and 2, it is evident that the embodiment of FIG. 3 comprises electrodes with sufficient carbon to operate for two weeks, after which the positive and negative polarities can be inverted, thus resulting in four weeks of work since, as indicate earlier, the anode consumes minimally.

Therefore, a novelty of the embodiments of FIG. 3 over those of FIGS. 1 and 2 is that, in the former embodiments, both anode and cathode must rotate, this time at the rate of ½ revolution per minute due to the increased diameter. These rotations are achieved via external electric motors 302 and 303 turning shafts, which end in 90 degree gears 304 and 305, operating copper shafts 306 and 307.

Electrodes 300 and 301 are fastened by cylindrical copper holders 308 and 309 whose outside diameter is 15" and inside diameter is 14" so as to envelope the electrodes. The DC current is delivered to the electrodes via sliding contacts 310 and 311 operating on the sides of copper holders 308 and 309 under pressure from springs. The polarities are then delivered to said sliding contacts via wires 312 and 313 passing through lid 314 of the equipment via pressure seals 315 and 316. Lid 314 is locked to ring 317 via means 318 for facilitating the rapid removal of the lid such as a quick release clamping device. In this way, the entire electrodes assembly are removed from the equipment via the lift of its lid 314 with ears (eye pads) 319, thus permitting rapid and easy service.

Internal vessel 320 consists of a metal cylinder of 6' diameter, 7' eight and ½" wall thickness which is surrounded by external vessel 321 so as to leave 3" interspace with vessel 320. Vessel 320 is filled up with liquid feedstock 322 up to the lower edge of exit pipe 323 for the produced combustible gas which exit vessels 320 and 321 through high pressure pipe 324. As in the preceding embodiments of FIGS. 1 and 2, part of the produced combustible gas can also be diverted from exit pipe 324 into high pressure recirculation pipe 325 and directed back into vessel 320 using a pump 326 and valve 327 for controlling the flow rate.

The partial re-circulation of the produced combustibles gas ends at exit pipe 328 with a T-shaped form similar to that depicted in FIGS. 2b and 2c, which releases said combustible gas through the entire arc gap 37 between the electrodes.

While electrode 300 is configured to rotate only, electrode 301 must not only rotate as well as, it must be capable of linear movement in its entirety toward the other electrode 300 so as to initiate, maintain and optimize the electric arc. The longitudinal or linear motion is achieved via support frame members 329 and 330, which pass through the lid 314 via insulating bushings 331. Support frame members 329 and 330 end in the outside of lid 314 with metal bridge 332 equipped with racks 333 and 334 capable of permitting at least 5" longitudinal motion. Racks 333 and 334 are operated by corresponding gear and electric motors 335 and 336 fastened to lid 314. This embodiment is completed with cooling means and related heat exchanger means and other features as in the preceding embodiments.

The embodiment of FIGS. 3a and 3b is ideally suited for operation with an AC powered electric arc because, in this case, both electrode consume at the same rate. Therefore, embodiments with large differences in the consumption of the two electrodes are generally recommended for DC powered electric arcs, while embodiments with similar electrodes are recommendable for AC powered electric arcs.

Figure 4A:
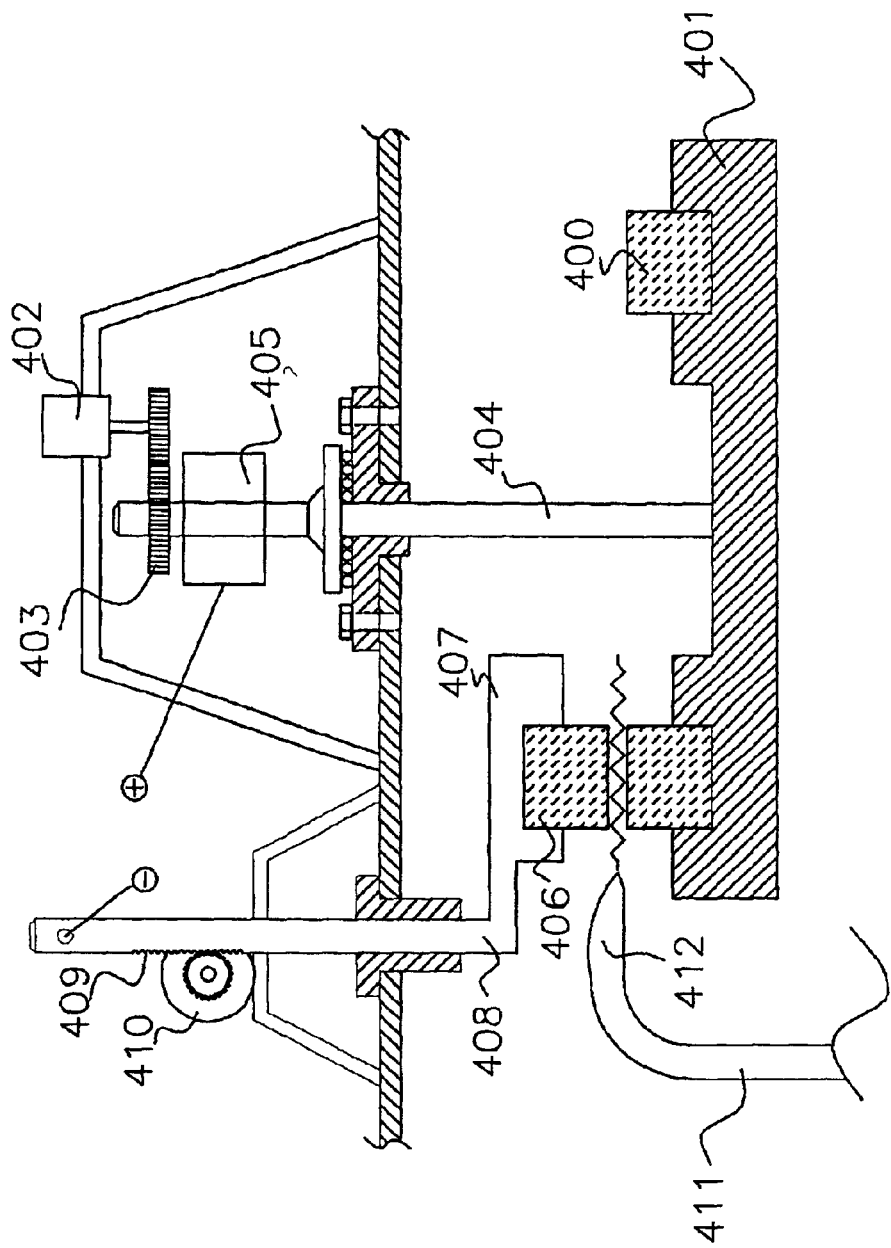
FIG. 4a depicts a partial cut away view of still another embodiment of the present invention.
Figure 4B:
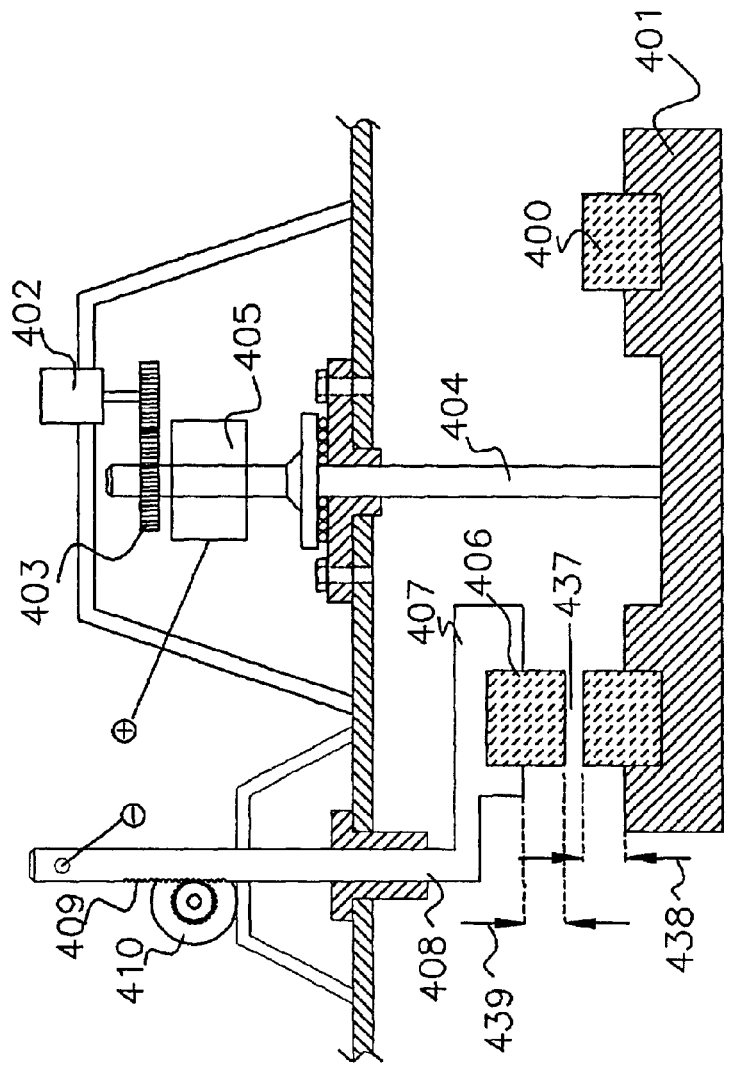
FIG. 4b depicts an embodiment similar to that depicted in FIG. 4a without the combustible gas recirculation line.

The alternative configuration of FIGS. 4a and 4b depicts cathode 400 in the shape of a ring having the approximate dimensions of 60" outside diameter, 40" inside diameter and 6" thickness, which permit the consumption of approximately 8,000 ci of carbon down to 1" thickness, the latter being the overhang of the copper holder 401 needed for fastening the cathode. The cathode 400 and its related holder 401 are made to rotate by motor 402 acting on gear 403 attached to conducting shaft 404. The positive polarity is delivered via sliding contact assembly 405 as in preceding embodiments. The anode 406 is comprised of a carbon base rod of 10" outside diameter and 6" length housed in conducting holder 407 attached to copper shaft 408, which is made to move vertically up or down by rake or rack gear 409 and related motor and gear assembly 410, so as to activate, maintain and optimize the arc. As in the previous embodiments described herein, the produced combustible gas may be recirculated through pipe 411 at exit beak or nozzle 412 such that the combustible gas can be force flown through the electric arc. The nozzle 412 typically ends with a 5" vertically shaped beak, which permits the flow of said combustible gas through the electric arc for all positions of the latter while cathode 400 is being consumed.

Figure 5A:
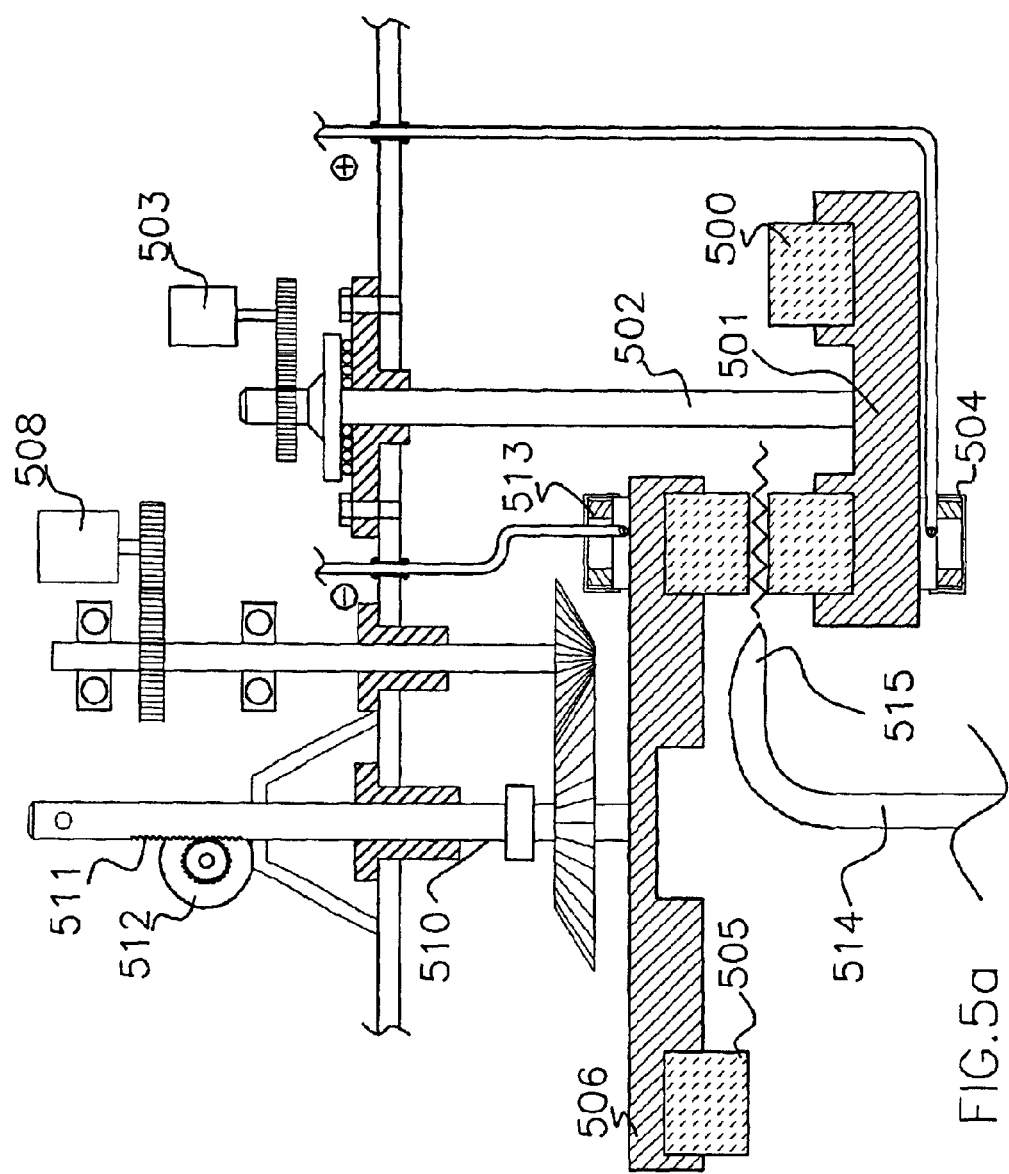
FIG. 5a depicts a partial cut away view of still another embodiment of the present invention.
Figure 5B:
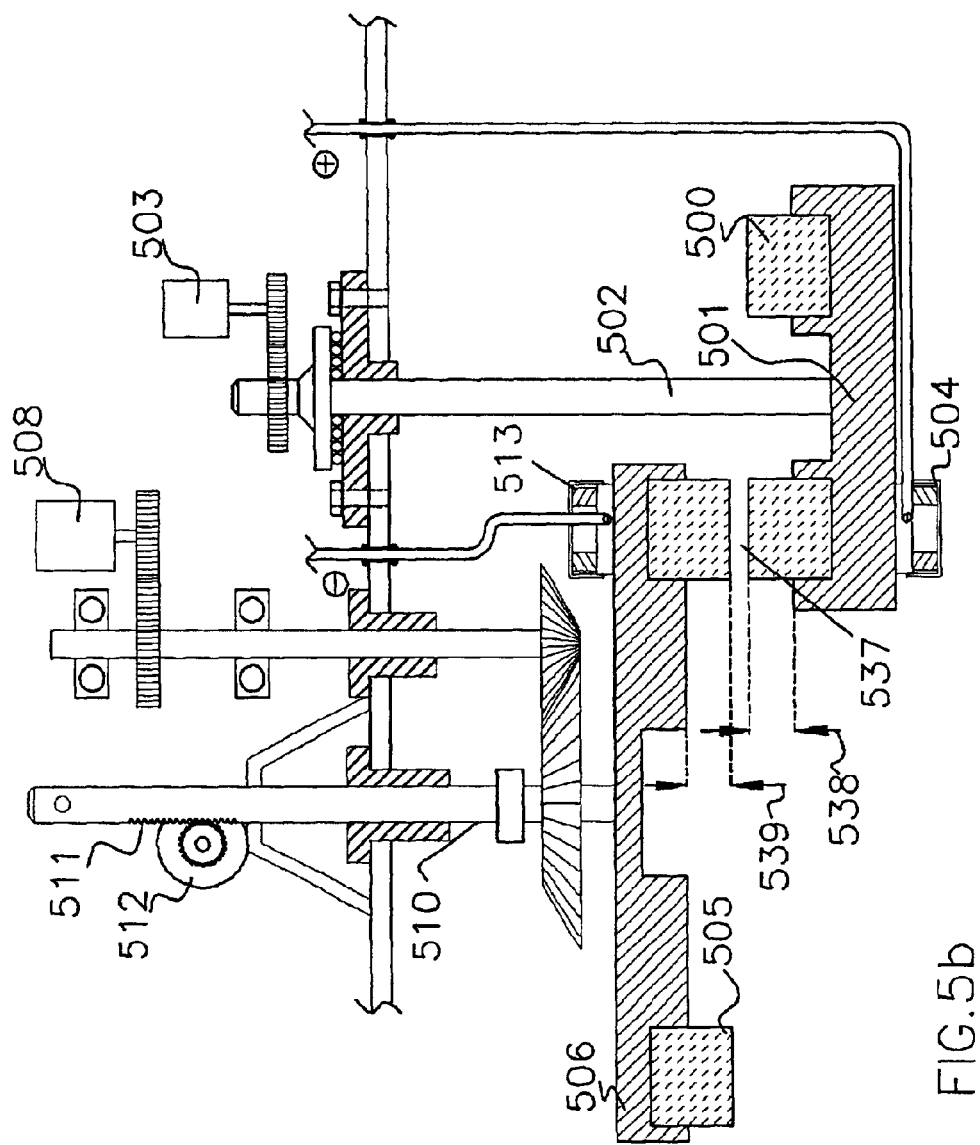
FIG. 5b depicts an embodiment similar to that depicted in FIG. 5a without the combustible gas recirculation line.

FIGS. 5a and 5b depict yet other embodiments capable of operating without interruption for one month consisting of four weeks each with 5 working days of 8 working hours. The embodiments comprise a cathode 500, related holder 501, shaft 502 and rotational means 503 which are the same as those in FIGS. 4a and 4b, the positive polarity being delivered in this case by sliding contact assembly 504 acting against copper holder 501 at the location of the arc to maximize efficiency. Anode 505 has the same ring configuration and dimension of cathode 500, consisting of a carbon-base ring of 60" outside diameter, 40" inside diameter and 6" thickness. Anode 505 and its related holder 506 are made to rotate by gear 507 acted upon by electric motor 508 and related shaft 509. In addition to said rotation, anode 505 and related holder 506 are made to move vertically upward and downward by shaft 510 equipped with rake or rack 511 acted upon by gear and motor assembly 512. The negative polarity of the electric current is delivered by contact assembly 513 acting on holder 506. Again, in an alternative embodiment similar to the previously described embodiments, the produced combustible gas may be partially recirculated via pipe 514 through the electric arc. Pipe 514 ends with a 10" wide vertical beak 515 which permits the flow of said combustible gas through the electric arc for all positions of the latter while cathode 500 is being consumed. In this embodiment, the electric arc is activated by the downward motion of anode 505 until contact with cathode 500 and subsequent upward motion to the gap 37, which is ¼" for a 200 Kwh power. Initially, only cathode 500 consumes, with anode 505 experiencing a comparatively much smaller consumption. After two weeks of operations, the polarities are inverted whereby anode 505 becomes the cathode and cathode 500 becomes the anode, thus permitting the complete consumption of the carbon in the electrodes.

Figure 6:
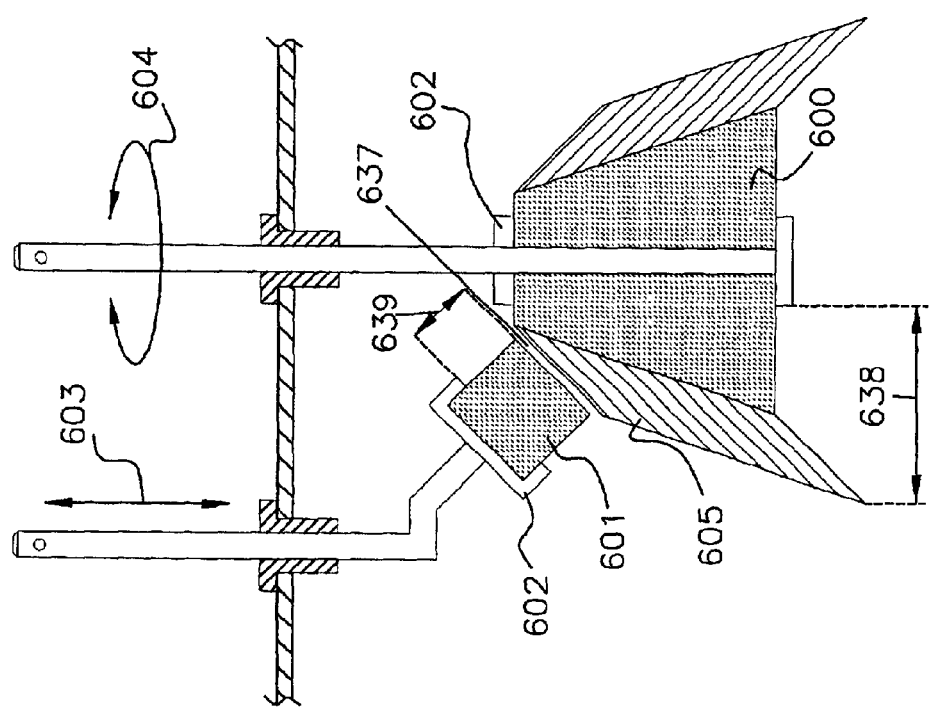
FIG. 6 depicts yet another embodiment the electrode configuration for the present invention which incorporates means for moving one of the electrodes up and down while the other electrode is rotatable.

FIG. 6 depicts yet another embodiment of this invention. Cathode 600 has the same dimension as those of the preceding embodiment so as to have about 8,000 ci of consumable carbon. Anode 601 has the shape of a cylindrical rod of 5" in diameter and 6" in total length of which 5" are usable due to holder 602 being engaged with the remaining 1". The embodiment has means similar to those described in previous embodiments for the upward and downward motion of anode 601 as shown by directional arrow 603, as well as means similar to those described for the above embodiments for the rotation of cathode 600 as shown by directional arrow 604. The downward motion of anode 601 during operation leads to the consumption of carbon in the cathode in the form of a truncated conical volume 605 progressively consumed. Cathode 600 is therefore built in such a length and diameter to allow 8,000 ci of carbon in the consumable volume. The remaining parts of the equipment that make up the embodiments contemplated by this electrode configuration are the same as those described in FIGS. 1–5.

Figure 7:
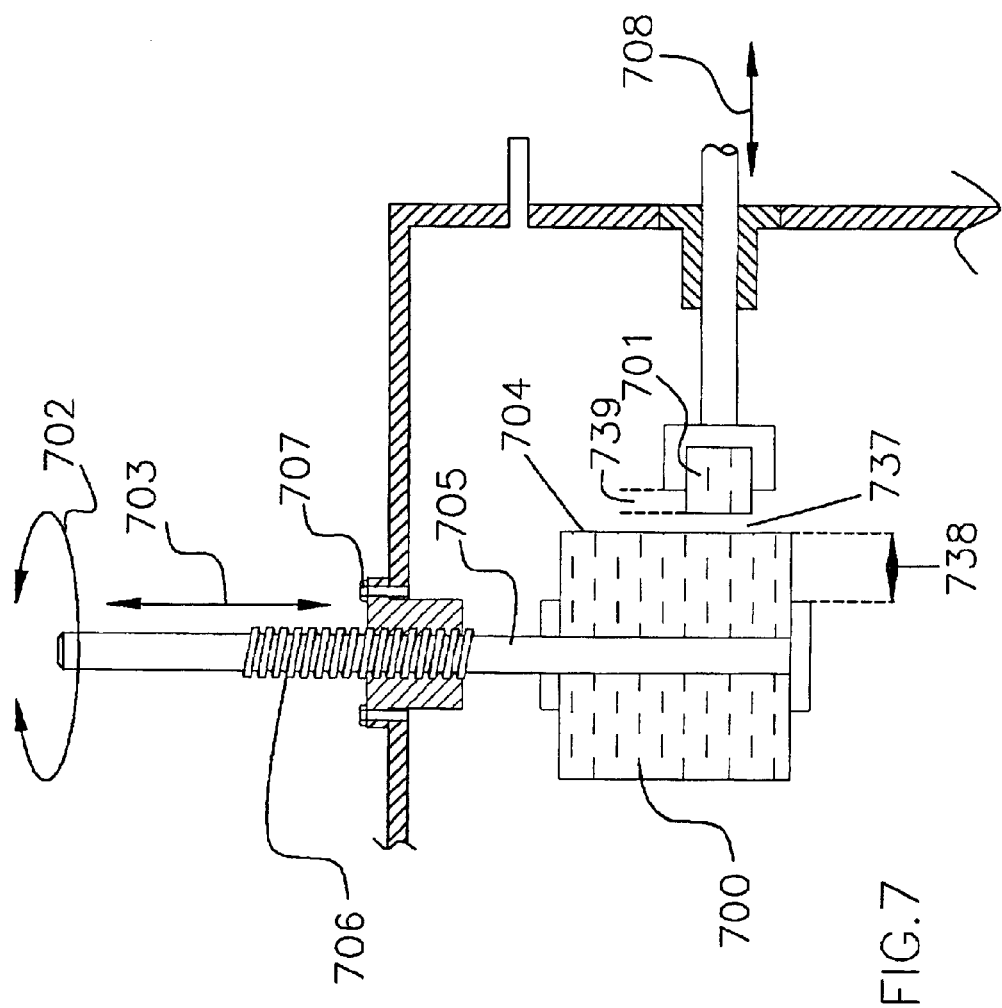
FIG. 7 depicts a still other embodiment of the electrode configuration, in which the cathode is the same as in FIGS. 1–5 while the anode is in the shape of a rod, and wherein the cathode has means both for reversible rotation and movement up and down.

FIG. 7 depicts yet another embodiment of this invention in which the cathode 700 is the same as those in FIGS. 1–5, while anode 701 has the shape of a rod 5" in outside diameter and 6" in length. In this case the embodiment has means not only for the rotation of cathode 700 as shown by directional arrow 702, but also for the upward and downward motion of cathode 700 as shown by directional arrow 703, so as to expose the entire cylindrical edge 704 of cathode 700 to anode 701. This dual motion can be realized in a number of ways, such as by reversible rotating means such as helicoidal gear 705 acting on a corresponding gear 706 in bushing 707. The initial position can be that of the conceptualized electrode arrangement shown in the Figure, in which cathode 700 is at the highest position permitted by the contact with anode 701. The rotating means, typical of the previous embodiments and as shown by directional arrow 702, will then cause a downward motion of cathode 700 as shown by directional arrow 703, all the way to the point where anode 701 is aligned with the upper edge 704 of the cylinder shaped cathode 700, at which point the rotation is inverted or reversed. This invertible or reversible rotational motion is then continued. Anode 701 is equipped with means, similar to linear movement means previously described in the other embodiments, for the motion toward and away from cathode 700, as shown by directional arrow 708, so as to activate, maintain and optimize the electric arc. The remaining parts of this embodiment are similar to the preceding ones.

Figure 8:
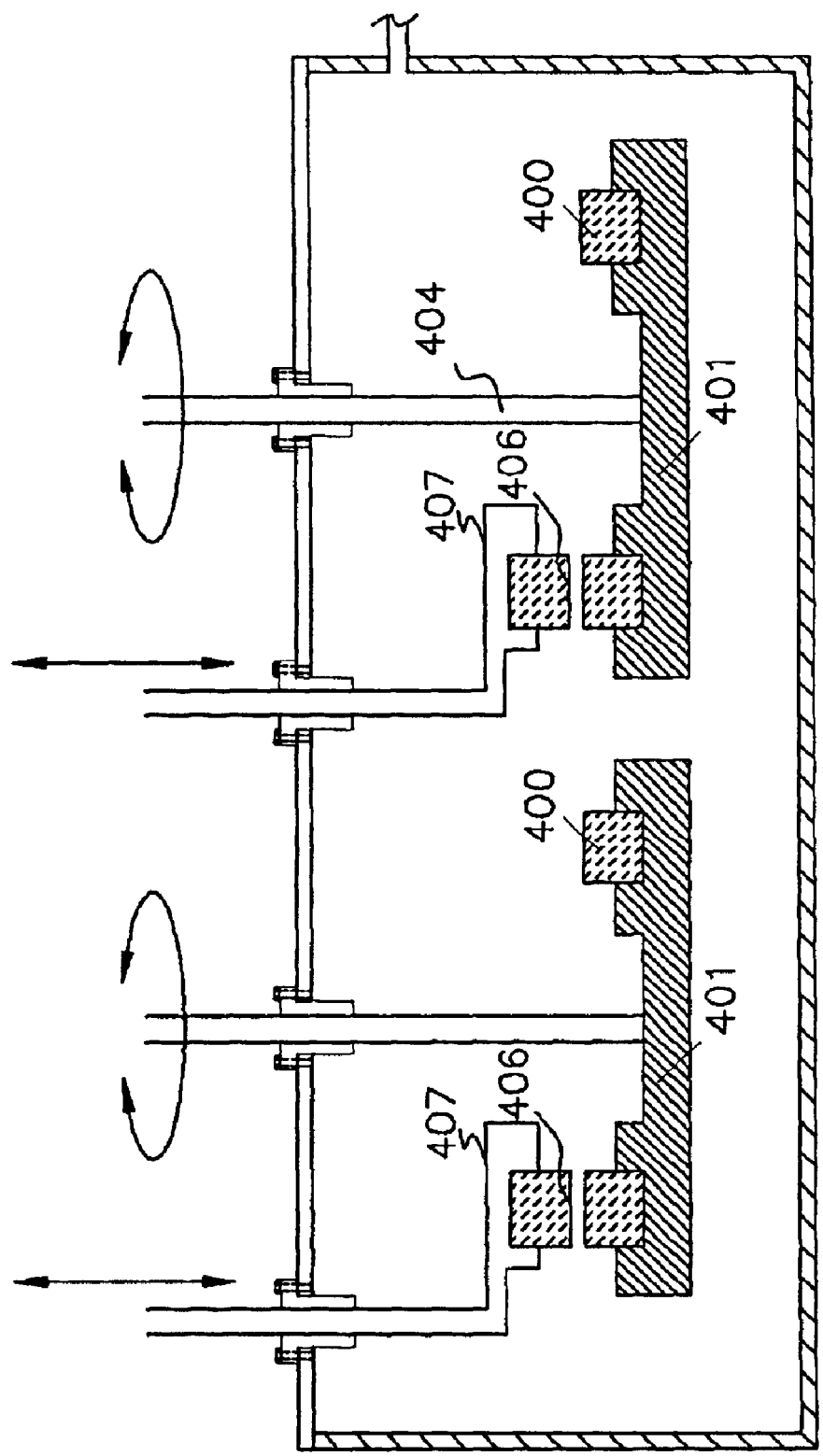
FIG. 8 is an example of a typical combination of multiple pairs of electrodes usable in the inner pressurized vessel.
Figure 9:
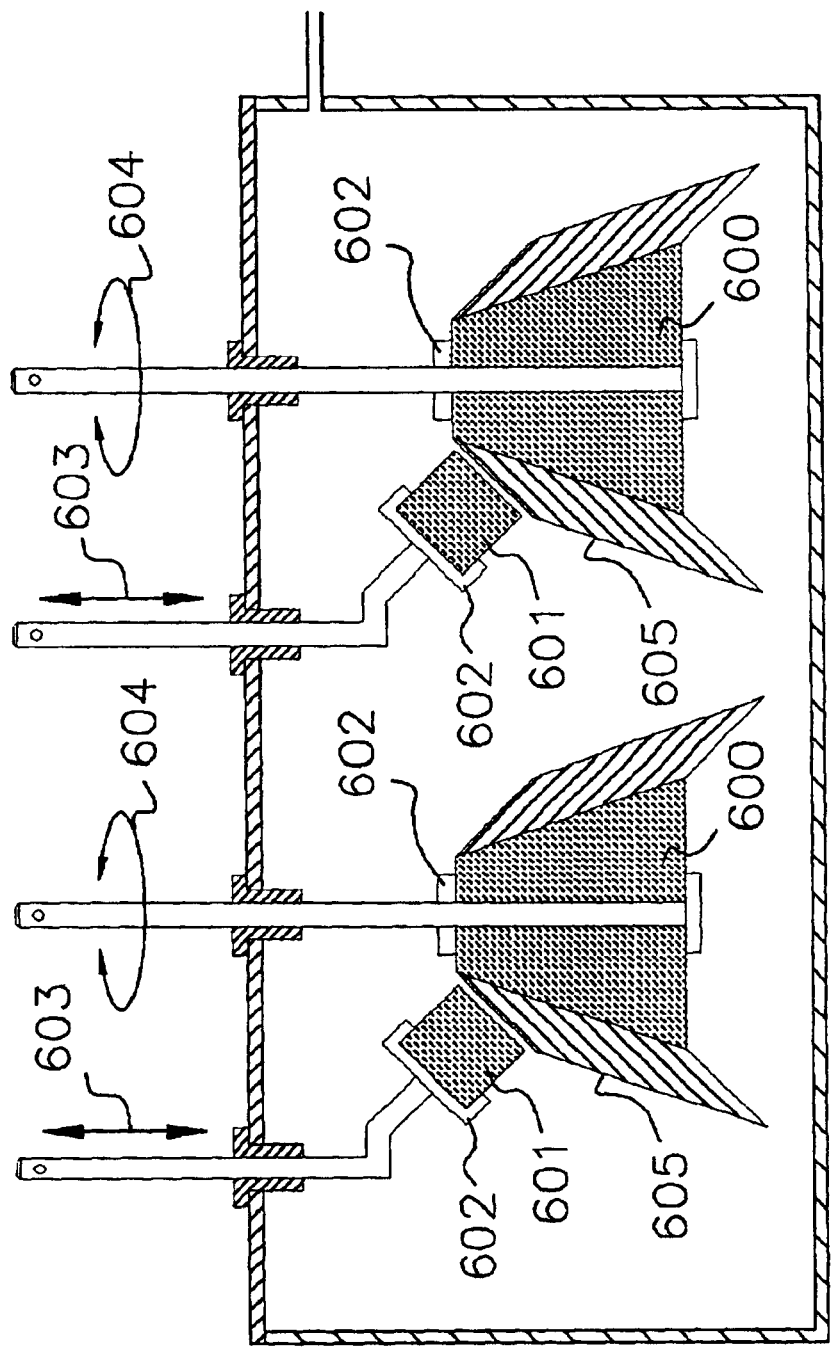
FIG. 9 is another example of a typical combination of multiple pairs of electrodes usable in the inner pressurized vessel.

Various combinations of electrode configurations as described herein above will contribute to the achievement of the desired long life of the electrodes. As an example only, FIGS. 8 and 9 conceptually depicts the use of multiple sets of electrodes in a vessel using electrode configurations similar to those depicted in FIGS. 4 and 6. Any combination of electrode configurations depicted in FIGS. 1 through 7 may be used to further increase the production rate of the clean combustible gas.

Until now we have referred this invention to the use of generic "carbon or carbon-base electrodes." It should be indicated that the use of "coal-base electrodes," that is, electrodes produced via the extrusion of ordinary coal in powdery form plus a bonding agent, are preferable inasmuch as they imply the production of a gas with bigger energy content without appreciably affecting the environmental quality of their combustion exhaust.

This result is due to the fact that all substances in the electrode are vaporized, then ionized, thus becoming part of the electric arc plasma. Their volatile components then enter into the final composition of the gas. It is then evident that the use of a coal-base electrode produces a combustible gas with bigger energy content than that of gas produced from pure graphite electrodes submerged within water as the same liquid feedstock. This is due to the presence in the coal-base electrodes of fossil substances absent in the pure graphite electrodes, which substances produce light hydrocarbons in the gas, while such light hydrocarbons are absent in the gas produced from pure graphite electrodes submerged within water.

It should also be noted that the increase of energy content of the gas produced from coal-base electrodes does not imply appreciable losses in the environmental quality of the combustion exhaust. This is due to the fact that said hydrocarbons are light; they are present in the gas only in small percentages; and their actual chemical composition is parts of complete hydrocarbon molecules called dimers, bonded with other dimers, atoms and molecules.

Owing to the above features, another main objective of this invention is a new form of gasification of coal into a clean burning gas which objective is first achieved via the use of coal for the production of the consumable electrodes. A second way to achieve the same objective is to add coal slurry to the liquid feedstock and flow the mixture of liquid feedstock and coal slurry substantially through the electric arc. Besides producing said new means of coal gasification, this second method implies a reduced consumption of the coal-base electrodes.

Oddly, in gases with magnecular structure hydrocarbon dimers are generally confused with complete hydrocarbon molecules even in the best equipped analytic laboratories staffed with senior chemists. This confusion is then another evidence of the novelty of this invention.

The above confusion is due to the fact that gas analyses are generally done with InfraRed Spectrometry which can only detect dimers (also called radicals), and cannot detect entire molecule. For instance, for the case of water vapor, InfraRed Spectrometry can only detect the OH dimer and cannot possibly detect the entire water molecule $H_2O$. Due to protracted work on gases with conventional molecular structure, the detection of the HO dimer is then generally believed to be evidence of the existence of the entire molecule $H_2O$. This personal belief by the analyst is generally correct with gases having conventional molecular structure, although it is generally erroneous for gases having a magnecular structure because in the latter case the presence of the dimer HO, by no means, is evidence for the existence of the entire molecule $H_2O$ and the same case occurs for hydrocarbon.

In fact, in decomposing the $H_2O=HOH$ molecule, the electric arc first creates HO and H, and then decomposes HO into H and O. When water is substantially flown through the electric arc, the OH dimers are removed from the electric arc and, therefore, cannot be decomposed any further. It then follows that the confusion of the detection of the OH dimer in magnegas with the complete molecule HOH has no scientific sense, and the same generally apply in the confusion of other dimers with complete molecules. At any rate, all these confusions are dramatically disproved by experimental evidence on the combustion exhaust.

At any rate, the assumption via InfraRed Spectreometry of complete hydrocarbon molecules in magnegas is readily disproved by the combustion exhaust. For instance, the presence of 5% methane in the produced gas using the apparatus herein described should have 0.5% of CO in the exhaust, because CO is indeed a by-product of the combustion of all hydrocarbons. This assumption is disproved by the evidence that, under perfect combustion, the gas produced with coal rod and water-base liquid feedstock have no CO at all.

Now that the drawings with their respective embodiments have been described in some detail, the invention includes the apparatus and its associated method for the production of a clean burning combustible gas by processing crude oil, or oil-base or water-base liquid waste as described above.

What is claimed is:

1. Apparatus for processing a liquid feedstock into a clean burning combustible gas via an electric arc adapted to be submerged in a liquid feedstock between at least one pair of electrodes with long life, minimal power losses and multiple flows substantially through said submerged electric arc, comprising:

a pressure resistant vessel;

the pressure resistant vessel adapted to be essentially filled with a liquid feedstock;

at least one pair of electrodes having copper holders extending into copper rods extending from inside the pressure resistant vessel to outside said pressure resistant vessel;

said at least one-pair of electrodes having means for minimizing a power, loss in the delivery of a current to an electric arc between the electrodes, said electrodes having remaining dimensions essentially unrestricted for maximizing their life;

means for delivering said current to said at least one pair of electrodes at least sufficient to create said electric arc;

motion means for acting on said copper rods for initiating, maintaining and optimizing said electric arc;

means for collecting the clean burning combustible gas produced by the electric arc;

means for automatically refilling the liquid feedstock for facilitating uninterrupted long operation; and heat exchanger means for utilizing a heat produced by a thermochemical reaction caused by said electric arc for maintaining a constant temperature.

2. The apparatus according to claim 1, wherein said liquid feedstock is crude oil.

3. The apparatus according to claim 1, wherein said liquid feedstock is an oil-base waste.

4. The apparatus according to claim 1, wherein said liquid feedstock is fresh water.

5. The apparatus according to claim 1, wherein said liquid feedstock is a water-base waste.

6. The apparatus according to claim 1, wherein said liquid feedstock is seawater.

7. The apparatus according to claim 1, wherein the current of said electric arc is continuous.

8. The apparatus according to claim 1, wherein the current of said electric arc is alternating.

9. The apparatus according to claim 1, wherein said electrodes are composed of graphite.

10. The apparatus according to claim 1, wherein said electrodes are composed of coal.

11. The apparatus according to claim 1, wherein one of the at least one pair of electrodes is adapted to be negatively charged and is composed of tungsten.

12. The apparatus according to claim 1,
wherein one of the at least one pair of electrodes is adapted to be positively charged and comprises an elongated and hollow cylinder which is adapted to be submerged in the liquid feedstock, said copper holder adapted to fill an internal volume of said hollow cylinder, and
wherein another of the at least one pair of electrodes is adapted to be negatively charged and comprises an elongated parallelepiped of length essentially equal to a length of said positively charged electrode and adapted to be submerged in the liquid feedstock, a minimal width and a minimal height to achieve the same life as that of the positively charged electrode, said negatively charged electrode being housed in a copper holder with a width protruding for consumption, said copper holder being placed at a minimal distance from the copper holder of the positively charged electrode, said negatively charged electrode being placed parallel to said positively charged electrode at a mutual distance suitable to generate said electric arc, and
further comprising:
means for axially rotating said positively charged electrode; and
means for radially moving the negatively charged electrode toward and away from said positively charged electrode.

13. The apparatus according to claim 1,
wherein one of the at least one pair of electrodes is adapted to be positively charged and comprises a ring adapted to be submerged in the liquid feedstock and housed within a copper holder with an axial portion protruding for consumption, and
wherein another of the at least one pair of electrodes is adapted to be negatively charged and comprises a rod adapted to be submerged in the liquid feedstock having essentially a diameter equal to a width of said ring and a minimal length to achieve the same life as that of the positively charged electrode, said negatively charged electrode being housed in a copper holder with an axial portions protruding for consumption, said copper holder being placed at a minimal distance from the copper holder of the positively charged electrode and having an axial alignment essentially perpendicular to a radial surface of said ring to create a gap suitable for the generation of the electric arc, and
further comprising:
means for axially rotating said ring-shaped electrode; and
means for axially moving said rod shaped electrode toward and away from the other electrode.

14. The apparatus according to claim 1,
wherein one of the at least one pair of electrodes is adapted to be positively charged and comprises an elongated and hollow cone adapted to be submerged in the liquid feedstock, said copper holder adapted to fill an internal volume of said hollow cone, and
wherein another of said at least one pair of electrodes is adapted to be negatively charged and comprises a rod adapted to be submerged in the liquid feedstock offset at an angle from an axis of said positively charged electrode to form a gap suitable for the generation of the electric arc, said negatively charged electrode being house in a copper holder with an axial part protruding for consumption, and said copper holder of the negatively charged electrode being placed at a minimal distance from the copper holder of said positively charged electrode, and
further comprising:
means for axially rotating said positively charged electrode; and
means for axially moving said negatively charged electrode toward and away from the conical electrode.

15. The apparatus according to claim 1,
wherein one of the at least one pair of electrodes is adapted to be positively charged and comprises an elongated and hollow cylinder adapted to be submerged in the liquid feedstock, said copper holder adapted to fill an internal volume of said hollow cylinder, and
wherein another of said at least one pair of electrodes is adapted to be negatively charged and comprises a rod adapted to be submerged in the liquid feedstock having a minimal diameter and length to achieve the same life as that of the positively charged electrode, said negatively charged electrode being housed in a copper holder with an axial length protruding for consumption, said copper holder being placed at a minimal distance from the copper holder of said positively charged electrode, and said positively and negatively charged electrodes having perpendicular axial orientations at a mutual distance suitable for the generation of the electric arc, and
further comprising:
means for rotationally, upwardly and downwardly moving said positively charged electrode in such a way to maintain the electric arc with said negatively charged electrode; and
means for axially moving said negatively charged electrode toward and away said positively charged electrode.

16. The apparatus according to claim 1,
wherein said at least one pair of electrodes comprises elongated and hollow cylinders of essentially equal lengths adapted to be submerged in the liquid feedstock, said copper holders adapted to fill internal volumes of said hollow cylinders, and said electrodes having parallel axial orientations at a mutual distance suitable to generate the submerged electric arc in their exterior cylindrical surfaces, and
further comprising:
means for axially rotating both electrodes; and
means for radially moving at least one of said at least one pair of electrodes toward and away from the other electrode.

17. The apparatus according to claim 1,
wherein said at least one pair of electrodes comprises rings of essentially the same widths and adapted to be submerged in the liquid feedstock, said rings being housed in copper holders with an axial part protruding for consumption, said copper holders being placed with parallel axes superimposed in such a way to create a gap in between their radial surfaces suitable for the generation of the electric arc, and further comprising:
means for rotating both rings; and
means for axially moving at least one ring toward and away from the other ring.

18. The apparatus according to claim 1,
wherein said holders of the at least one pair of electrodes are adapted to penetrate a lid of said pressure resistant vessel, said lid having means for its rapid removal to facilitate the rapid servicing of the at least one pair of electrodes.

19. The apparatus according to claim 1, further comprising:
means for circulating a portion of the produced gas exiting the pressurized vessel back into said vessel and substantially through said electric arc.

20. The apparatus according to claim 1, further comprising:
means for circulating said liquid feedstock substantially through said electric arc.

21. The apparatus according to claim 1, further comprising:
means for circulating a liquid additive rich in a substance missing in the liquid feedstock substantially through said electric arc.

22. The apparatus according to claim 21,
wherein said liquid feedstock is carbon-deficient, and
wherein said liquid additive is carbon-rich.

23. The apparatus according to claim 22,
wherein said carbon-rich liquid additive is an oil.

24. The apparatus according to claim 21,
wherein said liquid feedstock is oxygen-deficient, and said liquid additive is oxygen-rich.

25. The apparatus according to claim 24,
wherein said oxygen-rich liquid additive is water.

26. The apparatus according to claim 21,
wherein said liquid feedstock is hydrogen-deficient, and
wherein said liquid additive is hydrogen-rich.

27. The apparatus according to claim 26,
wherein said hydrogen-rich liquid additive includes a substance selected from the group consisting of hydrohalogens.

28. The apparatus according to claim 21, further comprising:
means for automatically refilling the liquid additive for facilitating uninterrupted long operation.

29. Apparatus for processing a liquid feedstock into a clean burning combustible gas via an electric arc adapted to be submerged in a liquid feedstock between at least one pair of electrodes with long life, minimal power losses and multiple flows substantially through said submerged electric arc, comprising:
a pressure resistant vessel;
the pressure resistant vessel adapted to be essentially filled with a liquid feedstock;
at least one pair of electrodes having copper holders extending into copper rods extending from inside the pressure resistant vessel to outside said pressure resistant vessel;
said at least one pair of electrodes having means for minimizing a power loss in the delivery of a current to an electric arc between the electrodes, said electrodes having remaining dimensions essentially unrestricted for maximizing their life;
means for delivering said current to said at least one pair of electrodes at least sufficient to create said electric arc;
motion means for acting on said copper rods for initiating, maintaining and optimizing said electric arc;
means for collecting the clean burning combustible gas produced by the electric arc;
means for flowing substantially through said electric arc one of a flow of said produced clean burning combustible gas, a flow of said liquid feedstock, a flow of a liquid additive rich in a substance missing in the liquid feedstock for the production of the clean burning combustible gas with a desired feature, and any combination thereof;
means for automatically refilling the liquid feedstock and said liquid additive for facilitating uninterrupted long operation; and
heat exchanger means for utilizing a heat produced by a thermochemical reaction caused by said electric arc for maintaining a constant temperature.

30. A method for processing a liquid feedstock into a clean burning combustible gas via an electric arc adapted to be submerged in a liquid feedstock between at least one pair of electrodes with long life, minimal power losses and multiple flows substantially through said submerged electric arc, comprising:
providing a pressure resistant vessel;
the pressure resistant vessel adapted to be essentially filled with a liquid feedstock;
providing at least one pair of electrodes having copper holders extending into copper rods extending from inside the pressure resistant vessel to outside said pressure resistant vessel;
said at least one pair of electrodes having means for minimizing a power loss in the delivery of a current to an electric arc between the electrodes, said electrodes having remaining dimensions essentially unrestricted for maximizing their life;
providing means for delivering a current to said at least one pair of electrodes at least sufficient to create said electric arc;
providing motion means for acting on said copper rods for initiating, maintaining and optimizing said electric arc;
providing means for collecting the clean burning combustible gas produced by the submerged electric arc;
providing means for automatically refilling the liquid feedstock for facilitating uninterrupted long operation; and
providing heat exchanger means for utilizing a heat produced by a thermochemical reaction caused by said electric arc for maintaining a constant temperature.

31. The method according to claim 30, wherein said liquid feedstock is crude oil.

32. The method according to claim 30, wherein said liquid feedstock is an oil-base waste.

33. The method according to claim 30, wherein said liquid feedstock is fresh water.

34. The method according to claim 30, wherein said liquid feedstock is a water-base waste.

35. The method according to claim 30, wherein said liquid feedstock is seawater.

36. The method according to claim 30, wherein the current of said electric arc is continuous.

37. The method according to claim 30, wherein the current of said electric arc is alternating.

38. The method according to claim 30, wherein said electrodes are composed of graphite.

39. The method according to claim 30, wherein said electrodes are composed of coal.

40. The method according to claim 30, wherein one of the at least one pair of electrodes is adapted to be negatively charged and is composed of tungsten.

41. The method according to claim 30,
wherein one of the at least one pair of electrodes is adapted to be positively charged and comprises an elongated and hollow cylinder which is adapted to be submerged in the liquid feedstock, said copper holder adapted to fill an internal volume of said hollow cylinder, and
wherein another of the at least one pair of electrodes is adapted to be negatively charged and comprises an elongated parallelepiped of length essentially equal to a length of said positively charged electrode and adapted to be submerged in the liquid feedstock, a minimal width and a minimal height to achieve the same life as that of the positively charged electrode, said negatively charged electrode being housed in a copper holder with a width protruding for consumption, said copper holder being placed at a minimal distance from the copper holder of the positively charged electrode, said negatively charged electrode being placed parallel to said positively charged electrode at a mutual distance to generate said electric arc, and
further comprising:
providing means for axially rotating said positively charged electrode; and
providing means for radially moving the negatively charged electrode toward and away from said positively charged electrode.

42. The method according to claim 30,
wherein one of the at least one pair of electrodes is adapted to be positively charged and comprises a ring adapted to be submerged in the liquid feedstock and housed within a copper holder with an axial portion protruding for consumption, and
wherein another of the at least one pair of electrodes is adapted to be negatively charged and comprises a rod adapted to be submerged in the liquid feedstock and having essentially a diameter equal to a width of said ring and a minimal length to achieve the same life as that of the positively charged electrode, said negatively charged electrode being housed in a copper holder with an axial portions protruding for consumption, said copper holder being placed at a minimal distance from the copper holder of the positively charged electrode and having an axial alignment essentially perpendicular to a radial surface of said ring to create a gap for the generation of the electric arc, and
further comprising:
providing means for axially rotating said ring-shaped electrode; and
providing means for axially moving said rod shaped electrode toward and away from the other electrode.

43. The method according to claim 30,
wherein one of the at least one pair of electrodes is adapted to be positively charged and comprises an elongated and hollow cone which is adapted to be submerged in the liquid feedstock, said copper holder adapted to fill an internal volume of said hollow cone, and
wherein another of said at least one pair of electrodes is adapted to be negatively charged and comprises a rod adapted to be submerged in the liquid feedstock offset at an angle from an axis of said positively charged electrode to form a gap for the generation of the electric arc, said negatively charged electrode being house in a copper holder with an axial part protruding for consumption, and said copper holder of the negatively charged electrode being placed at a minimal distance from the copper holder of said positively charged electrode, and
further comprising:
providing means for axially rotating said positively charged electrode; and
providing means for axially moving said negatively charged electrode toward and away from the conical electrode.

44. The method according to claim 30,
wherein one of the at least one pair of electrodes is adapted to be positively charged and comprises an elongated and hollow cylinder which is adapted to be submerged in the liquid feedstock, said copper holder adapted to fill an internal volume of said hollow cylinder, and
wherein another of said at least one pair of electrodes is adapted to be negatively charged and comprises a rod which is adapted to be submerged in the liquid feedstock and having a minimal diameter and length to achieve the same life as that of the positively charged electrode, said negatively charged electrode being housed in a copper holder with an axial length protruding for consumption, said copper holder being placed at a minimal distance from the copper holder of said positively charged electrode, and said positively and negatively charged electrodes having perpendicular axial orientations at a mutual distance for the generation of the electric arc, and
further comprising:
providing means for rotationally, upwardly and downwardly moving said positively charged electrode in such a way to maintain the electric arc with said negatively charged electrode; and
providing means for axially moving said negatively charged electrode toward and away said positively charged electrode.

45. The method according to claim 30,
wherein said at least one pair of electrodes comprises elongated and hollow cylinders of essentially equal lengths and adapted to be submerged in the liquid feedstock, said copper holders adapted to fill internal volumes of said hollow cylinders, and said electrodes having parallel axial orientations at a mutual distance to generate the electric arc in their exterior cylindrical surfaces, and
further comprising:
providing means for axially rotating both electrodes; and
providing means for radially moving at least one of said at least one pair of electrodes toward and away from the other electrode.

46. The method according to claim 30,
wherein said at least one pair of electrodes comprises rings of essentially the same widths which are adapted to be submerged in the liquid feedstock, said rings being housed in copper holders with an axial part protruding for consumption, said copper holders being placed with parallel axes superimposed in such a way to create a gap in between their radial surfaces for the generation of the electric arc, and further comprising:

providing means for rotating both rings; and providing means for axially moving at least one ring toward and away from the other ring.

47. The method according to claim 30, wherein said holders of the at least one pair of electrodes penetrates a lid of said pressure resistant vessel, said lid having means for its rapid removal to facilitate the rapid servicing of the at least one pair of electrodes.

48. The method according to claim 30, further comprising:

providing means for circulating a portion of the produced gas exiting the pressurized vessel back into said vessel and substantially through said electric arc.

49. The method according to claim 30, further comprising:

providing means for circulating said liquid feedstock substantially through said electric arc.

50. The method according to claim 30, further comprising:

providing means for circulating a liquid additive substantially through said electric arc.

51. The method according to claim 50, wherein said liquid feedstock is carbon-deficient, and wherein said liquid additive is carbon-rich.

52. The method according to claim 51, wherein said carbon-rich liquid additive is an oil.

53. The method according to claim 50, wherein said liquid feedstock is oxygen-deficient, and said liquid additive is oxygen-rich.

54. The method according to claim 53, wherein said oxygen-rich liquid additive is water.

55. The method according to claim 50, wherein said liquid feedstock is hydrogen-deficient, and wherein said liquid additive is hydrogen-rich.

56. The method according to claim 55, wherein said hydrogen-rich liquid additive includes a substance selected from the group consisting of hydrohalogens.

57. The method according to claim 50, further comprising:

providing means for automatically refilling the liquid additive for facilitating uninterrupted long operation.

58. The method according to claim 30, wherein power is supplied to the electrodes during its operation at a power of at least 200 Kwh.

59. The method according to claim 30, wherein power is supplied to the electrodes during its operation at a power of at least 50 Kwh.

60. A method for processing a liquid feedstock into a clean burning combustible gas via an electric arc adapted to be submerged in a liquid feedstock between at least one pair of electrodes with long life, minimal power losses and multiple flows substantially through said electric arc, comprising:

providing a pressure resistant vessel;

the pressure resistant vessel adapted to be essentially filled with a liquid feedstock;

providing at least one pair of electrodes having copper holders extending into copper rods extending from inside the pressure resistant vessel to outside said pressure resistant vessel;

said at least one pair of electrodes having for minimizing a power loss in the delivery of a current to said electric arc between the electrodes, said electrodes having remaining dimensions essentially unrestricted for maximizing their life;

providing means for delivering a current to said at least one pair of electrodes at least sufficient to create said electric arc;

providing motion means for acting on said copper rods for initiating, maintaining and optimizing said electric arc;

providing means for collecting the clean burning combustible gas produced by the electric arc;

providing means for flowing substantially through said electric arc one of a flow of said produced clean burning combustible gas, a flow of said liquid feedstock, a flow of a liquid additive rich in a substance missing in the liquid feedstock for the production of the clean burning combustible gas with a desired feature, and any combination thereof;

providing means for automatically refilling the liquid feedstock and said liquid additive for facilitating uninterrupted long operation; and providing heat exchanger means for utilizing a heat produced by a thermochemical reaction caused by said electric arc for maintaining a constant temperature.

* * * * *